(12) United States Patent
Radzyner

(10) Patent No.: US 11,957,113 B2
(45) Date of Patent: Apr. 16, 2024

(54) AUTOMATIC BEEHIVES

(71) Applicant: Beewise Technologies LTD., Klil (IL)

(72) Inventor: Eliyah Radzyner, Klil (IL)

(73) Assignee: Beewise Technologies LTD, Kibbutz Beit-Haemek (IL)

( * ) Notice: Subject to any disclaimer, the term of this patent is extended or adjusted under 35 U.S.C. 154(b) by 83 days.

(21) Appl. No.: 16/872,769

(22) Filed: May 12, 2020

(65) Prior Publication Data

US 2020/0315143 A1 Oct. 8, 2020

Related U.S. Application Data

(63) Continuation-in-part of application No. PCT/IL2018/051223, filed on Nov. 13, 2018.

(60) Provisional application No. 62/904,695, filed on Sep. 24, 2019, provisional application No. 62/904,699, filed on Sep. 24, 2019, provisional application No.
(Continued)

(51) Int. Cl.
| | |
|---|---|
| A01K 47/00 | (2006.01) |
| A01K 47/06 | (2006.01) |
| A01K 51/00 | (2006.01) |
| A01K 53/00 | (2006.01) |
| A01K 59/00 | (2006.01) |

(52) U.S. Cl.
CPC ............. *A01K 59/00* (2013.01); *A01K 47/06* (2013.01); *A01K 51/00* (2013.01); *A01K 53/00* (2013.01)

(58) Field of Classification Search
CPC ........ A01K 59/00; A01K 47/00; A01K 51/00; A01K 53/00
See application file for complete search history.

(56) References Cited

U.S. PATENT DOCUMENTS

| | | | |
|---|---|---|---|
| 1,768,041 A | 6/1930 | Fenno | |
| 3,456,056 A * | 7/1969 | Reich | ............ A01K 51/00 |

(Continued)

FOREIGN PATENT DOCUMENTS

| | | |
|---|---|---|
| CN | 101720680 | 6/2010 |
| CN | 203087245 | 7/2013 |

(Continued)

OTHER PUBLICATIONS

International Search Report and the Written Opinion dated Jan. 6, 2021 From the International Searching Authority Re. Application No. PCT/IL2020/051052. (11 Pages).

(Continued)

*Primary Examiner* — Joshua J Michener
*Assistant Examiner* — Henry Hooper Mudd

(57) ABSTRACT

An automatic unit for one or several beehives for commercial or recreational beekeeping including honey production and pollination services comprises: (a) a plurality of bee frames (honeycomb, brood frames and other bee frames) releasably mounted within at least one hive chamber; (b) a mechanism for removing the bee frames from the hive chamber and inserting the bee frames thereinto; (c) an automated honey harvesting arrangement; (d) an arrangement for monitoring bees conditions, analyzing obtained data and reporting results to a user; and (e) an arrangement for feeding bees, pest and climate control. The mechanism for removing and inserting the bee frames comprises a frame loader linearly displaceable along at least one hive chamber.

32 Claims, 23 Drawing Sheets

Related U.S. Application Data

62/904,701, filed on Sep. 24, 2019, provisional application No. 62/904,703, filed on Sep. 24, 2019, provisional application No. 62/584,952, filed on Nov. 13, 2017.

(56) References Cited

U.S. PATENT DOCUMENTS

| | | | |
|---|---|---|---|
| 3,771,179 A | 11/1973 | Ogilby | |
| 3,789,443 A * | 2/1974 | Cowen | A01K 51/00 6/12 A |
| 3,914,812 A * | 10/1975 | Kent | A01K 47/00 6/1 |
| 3,999,237 A * | 12/1976 | Solomon | A01K 47/00 6/1 |
| 4,288,880 A | 9/1981 | Gary et al. | |
| 4,520,519 A | 6/1985 | Kuehl | |
| 4,573,228 A | 3/1986 | Bachalo | |
| 5,685,762 A | 11/1997 | Penrose et al. | |
| 6,475,061 B1 | 11/2002 | Huang | |
| 6,524,058 B1 * | 2/2003 | Watters | B65G 57/00 414/795.7 |
| 8,602,837 B1 * | 12/2013 | Allan | A01K 47/00 449/1 |
| 10,645,910 B1 | 5/2020 | Gil Gonzalez | |
| 10,757,921 B1 | 9/2020 | Wood | |
| 2002/0086430 A1 * | 7/2002 | Hopmeier | G01N 33/02 436/20 |
| 2012/0202403 A1 | 8/2012 | Sinanis et al. | |
| 2014/0212520 A1 | 7/2014 | Del Vecchio | |
| 2014/0370781 A1 | 12/2014 | Anderson et al. | |
| 2015/0049919 A1 * | 2/2015 | Humal | A01K 51/00 |
| 2016/0015007 A1 | 1/2016 | Sinanis | |
| 2017/0064931 A1 | 3/2017 | Tagliaferri | |
| 2017/0360010 A1 | 12/2017 | Wilson-Rich | |
| 2018/0160656 A1 | 6/2018 | Ben-Shimon et al. | |
| 2018/0288977 A1 * | 10/2018 | Hummer | A01K 51/00 |
| 2020/0267945 A1 * | 8/2020 | Symes | A01K 47/06 |
| 2020/0315143 A1 | 10/2020 | Radzyner | |
| 2020/0349397 A1 | 11/2020 | Criswell et al. | |
| 2021/0161107 A1 | 6/2021 | Gamberoni et al. | |
| 2021/0289765 A1 | 9/2021 | Scofield et al. | |
| 2022/0022429 A1 | 1/2022 | Hummer et al. | |
| 2022/0264854 A1 | 8/2022 | Radzyner | |
| 2022/0295760 A1 | 9/2022 | Radzyner | |
| 2022/0369602 A1 | 11/2022 | Radzyner et al. | |

FOREIGN PATENT DOCUMENTS

| | | | |
|---|---|---|---|
| CN | 103583416 | 2/2014 | |
| CN | 105 519 456 A | 4/2016 | |
| CN | 105519456 A * | 4/2016 | A01K 47/04 |
| CN | 205511589 | 8/2016 | |
| CN | 205511592 | 8/2016 | |
| CN | 106 719 106 A | 5/2017 | |
| CN | 107047378 | 8/2017 | |
| CN | 108668955 A | 10/2018 | |
| DE | 20 2006 007269 U1 | 7/2006 | |
| DE | 10 2013 006265 A1 | 10/2014 | |
| IT | UB20159742 A1 | 6/2017 | |
| KR | 200460083 Y1 | 5/2012 | |
| KR | 20120045211 A | 5/2012 | |
| KR | 10-2012-0060253 | 6/2012 | |
| KR | 20120060253 A * | 6/2012 | A01K 51/00 |
| KR | 20120102497 A | 9/2012 | |
| KR | 101244803 B1 | 3/2013 | |
| KR | 20140059538 A | 5/2014 | |
| KR | 200475229 Y1 | 11/2014 | |
| KR | 20160101621 A | 8/2016 | |
| KR | 20180054182 A | 5/2018 | |
| KR | 102093334 B1 | 3/2020 | |
| WO | 2012/108857 A1 * | 8/2012 | A01K 47/06 |
| WO | WO 2019/092731 | 5/2019 | |
| WO | WO 2019/148235 | 8/2019 | |
| WO | WO 2021/059282 | 4/2021 | |

OTHER PUBLICATIONS

International Preliminary Report on Patentability dated May 19, 2020 From the International Bureau of WIPO Re. Application No. PCT/IL2018/051223. (7 Pages).
International Search Report and the Written Opinion dated Feb. 17, 2019 From the International Searching Authority Re. Application No. PCT/IL2018/051223. (11 Pages).
Notification of Office Action dated Oct. 28, 2020 From the State Intellectual Property Office of the People's Republic of China Re. Application No. 201880073417.7. (7 Pages).
Supplementary European Search Report and the European Search Opinion dated Oct. 30, 2020 From the European Patent Office Re. Application No. 18876119.1. (9 Pages).
Translation Dated Nov. 23, 2020 of Notification of Office Action dated Oct. 28, 2020 From the State Intellectual Property Office of the People's Republic of China Re. Application No. 201880073417. 7. (11 Pages).
PCT Search Report for International Application No. PCT/IL2018/ 051223, dated Feb. 17, 2019, 4 pp.
PCT Written Opinion for International Application No. PCT/IL2018/ 051223, dated Feb. 17, 2019, 6 pp.
Communication and Supplementary Partial European Search Report for Application No. EP 20 86 8356; dated Feb. 22, 2023 (10 pages).
Communication and European Search Report for Application No. EP 22 19 7442; dated Feb. 2, 2023 (7 pages).
Communication and European Search Report for Application No. EP 22 19 7464; dated Feb. 2, 2023 (9 pages).
USPTO office action for U.S. Appl. No. 17/857,071; dated Oct. 20, 2022 (27 pages).
Communication Pursuant to Article 94(3) EPC dated Nov. 6, 2023 From the European Patent Office Re. Application No. 2219764.5. ( 7 Pages).
Communication Pursuant to Article 94(3) EPC dated Aug. 28, 2023 From the European Patent Office Re. Application No. 22197442.1. (7 Pages).
Interview Summary dated Nov. 6, 2023 from US Patent and Trademark Office Re. U.S. Appl. No. 17/737,147. (2 pages).
Invitation pursuant to Rule 137(4) EPC and Article 94(3) EPC dated Sep. 20, 2023 From the European Patent Office Re. Application No. 18876119.1. (5 Pages).
Notice of Allowance dated Nov. 8, 2023 from US Patent and Trademark Office Re. U.S. Appl. No. 17/737,147. (10 pages).
Notice of Allowance dated Oct. 18, 2023 from US Patent and Trademark Office Re. U.S. Appl. No. 17/835,163. (10 pages).
Office Action dated Jul. 9, 2023 From the Israel Patent Office Re. Application No. 274613. (3 Pages).
Official Action dated May 3, 2023 from US Patent and Trademark Office Re. U.S. Appl. No. 17/737,147. (25 pages).
Official Action dated Dec. 6, 2023 from US Patent and Trademark Office Re. U.S. Appl. No. 17/762,211. (20 pages).
Official Action dated Feb. 8, 2023 from US Patent and Trademark Office Re. U.S. Appl. No. 17/835,163. (51 pages).
Official Action dated Jul. 19, 2023 from US Patent and Trademark Office Re. U.S. Appl. No. 17/737,147. (24 pages).
Official Action dated Nov. 21, 2022 from US Patent and Trademark Office Re. U.S. Appl. No. 17/737,147. (21 pages).
Official Action dated Jul. 28, 2023 from US Patent and Trademark Office Re. U.S. Appl. No. 17/835,163. (15 pages).
Decision on Rejection dated Jan. 8, 2024 From the State Intellectual Property Office of the People's Republic of China Re. Application No. 202080079606.2 and It's Machine translation. (17 Pages).
Notice of Allowance dated Jan. 8, 2024 from the US Patent and Trademark Office Re. U.S. Appl. No. 17/835,163. (8 pages).
Office action for U.S. Appl. No. 17/762,211; dated Aug. 8, 2023 (203 pages).

* cited by examiner

AUTOMATIC BEEHIVES

CROSS-REFERENCES TO RELATED APPLICATIONS

This application is a continuation-in-part of PCT/IL2018/051223 filed on Nov. 13, 2018 which claims the benefit of priority of U.S. Provisional Application No. 62/584,952 filed on Nov. 13, 2017. The application also claims the benefit of priority of U.S. Provisional Application Nos. 62/904,695; 62/904,699; 62/904,701 and 62/904,703 filed on Sep. 24 2019. The contents of the above applications are all incorporated by reference as if fully set forth herein in their entireties.

TECHNICAL FIELD

The present disclosed subject matter relates to beehives. More particularly, the present disclosed subject matter relates to efficient automatic beehives.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BACKGROUND OF THE INVENTION

Beekeeping has barely changed in the past 150 years and is still based on traditional labor-intensive work practices which have not been modernized. Inadequate beekeeping methods combined with new pests and diseases have put apiaries in the face of high annual colony loss rates associated with the varroa mite and Colony Collapse Disorder (CCD). Traditional work practices have become increasingly difficult and have had a strong negative effect on the profitability of beekeeping in the honey industry. An astonishing 70% of the honey sold at supermarkets as pure honey is not pure. This results from the lack of traceability in the honey production process.

The contribution of bees to agriculture is estimated at $160 B a year. Since the 1990's the rate of increase in pollination-based agriculture has sharply increased, surpassing the average increase in the number of hives. This situation in addition to the recent colony loss crises has created a severe shortage in bees for pollination. This has a very strong effect on the pollination market. In the US prices for pollination services have tripled over the past 15 years.

SUMMARY OF THE INVENTION

It is hence one object of the invention to disclose an automatic beehive for commercial beekeeping including honey production and pollination services. The aforesaid automatic beehive comprises: (a) a plurality of honeycomb brood frames and other frames in the hive releasably mounted within at least one hive chamber; (b) a mechanism for removing all kind of bee frames such as honeycomb or brood frames and other types of frames from said hive chamber and inserting said bee frames thereinto; (c) an automated honey harvesting arrangement; (d) an arrangement for monitoring hive and bees conditions, analyzing obtained data and reporting results to a user; and (e) an arrangement for feeding bees, pest and climate control. (f) An AI based decision making algorithm based on data gathered from the hives which will alert the user, suggest and perform beekeeping practices within the unit in an automatic manner.

It is a core purpose of the invention to provide the mechanism for removing and inserting said bee frames (all kind of frames in the hive) comprising a frame loader linearly displaceable along said at least one hive chamber.

Another object of the invention is to disclose the frame loader displaceable along at least one main rail oriented in parallel to a face of hive chamber.

A further object of the invention is to disclose the frame loader driven by a motor.

A further object of the invention is to disclose the frame loader comprising a mechanism configured for releasably gripping said bee frames therewithin.

A further object of the invention is to disclose the mechanism is a gripper.

A further object of the invention is to disclose the frame loader linearly displaceable perpendicular to said face of said at least one hive chamber such that said honey frames in said hive chamber is removable from and insertable into said at least one hive chamber.

A further object of the invention is to disclose the frame loader comprising at least one loader rail oriented perpendicular to said face of said at least one hive chamber and a ball-screw linear actuator configured for removing and inserting said bee frame gripped within said frame loader.

A further object of the invention is to disclose the frame loader comprising a loader mechanism configured for directing said bee frames during removing and inserting thereof.

A further object of the invention is to disclose the honey harvesting arrangement comprising at least one sensor configured for monitoring said honeycombs to be harvested.

A further object of the invention is to disclose the honey harvesting arrangement comprising a centrifuge honey extractor.

A further object of the invention is to disclose a mechanism for controlling the size of the opening of the hives used for bees in order to exit and enter the hive in order to collect pollen, nectar etc., based on a mechanical arrangement for enlarging and diminishing the opening automatically operated by the unit.

A further object of the invention is to disclose the arrangement for monitoring hive and bees conditions, analyzing obtained data and reporting results to a user comprising optical means selected from the group consisting of a camera, a scanner, a mirror configured for forming images of said honeycomb and brood frames and a light source for illumination of said honeycomb and brood frames.

A further object of the invention is to disclose the arrangement for feeding bees, pest and climate control comprising a sugar tank, a water tank, a pesticide tank, a sugar solution mixer and a dispenser of an obtained solution.

A further object of the invention is to disclose the arrangement for feeding bees, pest and climate control comprising an air conditioning system.

A further object of the invention is to disclose the arrangement for monitoring bees conditions, analyzing obtained data and reporting results to a user comprising at least one sensor and artificial intelligence unit configured for classifying current well-being of said hive chambers hives inside the automatic beehive.

A further object of the invention is to disclose the at least one sensor and artificial intelligence unit configured for obtaining metrics of said well-being of said hive chambers, making beekeeping decisions and predicting failure modes of said beehive.

A further object of the invention is to disclose a method of producing honey comprising steps of: (a) providing an automatic system for maintaining bees; said autonomic beehive comprising: (i) a plurality of honeycomb and brood frames releasably mounted within at least one hive chamber; (ii) a mechanism for removing said bee frames from said hive chamber and inserting said bee frames thereinto; (iii) an automated honey harvesting arrangement; (iv) an arrangement for monitoring hive and bees conditions, analyzing obtained data and reporting results to a user; and (v) an arrangement for feeding bees, pest and climate control; said mechanism for removing and inserting said bee frames comprises a frame loader linearly displaceable along said at least one hive chamber; (b) providing honey bees; (c) maintaining internal climate conditions effective for honey production; (d) monitoring hive and bees conditions; (e) analyzing obtained data; (f) breeding said honey bees; (g) reporting analyzed data to a user; (h) harvesting honey.

It is another core purpose of the invention to provide the method comprising steps of removing and inserting said bee frames performed by a frame loader linearly displaceable along said at least one hive chamber.

A further object of the invention is to disclose a beehive for commercial or recreational beekeeping comprising honey production and pollination services; said beehive comprises: (a) a plurality of bee frames releasably mounted within at least one hive chamber; and (b) an arrangement for releasably securing said bee frames within said hive chamber.

It is a core purpose of the invention to provide the arrangement for hanging and releasably securing said bee frames comprises a base plate, a plurality of t-head connecting elements and a plurality of t-slots; said plurality of t-head connecting elements is releasably receivable within said plurality of t-slots.

Another object of the invention is to disclose the plurality of t-head connecting elements are secured to said base plate and arranged such that said bee frames provided with said t-slots are hangable to said base plate.

A further object of the invention is to disclose the plurality of said base plate provided with said plurality of t-slots. The bee frames are provided with said t-head connecting elements such that said bee frames are hangable to said base plate.

A further object of the invention is to disclose the beehive comprising at least one arrangement selected from the group consisting of: (a) an automated honey harvesting arrangement; (b) an arrangement for monitoring bees conditions, analyzing obtained data and reporting results to a user; and (c) an arrangement for feeding bees, pest and climate control.

A further object of the invention is to disclose beehive for commercial or recreational beekeeping comprising honey production and pollination services. The aforesaid beehive comprises: (a) a plurality of bee frames releasably mounted within at least one hive chamber; and (b) an arrangement for removing said bee frames from said hive chamber and inserting said bee frames thereinto;

It is a core purpose of the invention to provide said arrangement for removing and inserting said bee frames comprising bee-barriers members configured for individually embracing said bee frames such that each bee frame passes through said bee-barrier member while bees maintained within said beehive are prevented from escaping from said beehive during replacement of said frames. Each of said bee-barrier member is provided with means for removing bees from said bee frames during removing thereof from said beehive.

Another object of the invention is to disclose the said means for removing bees from said bee frames comprising a member selected from the group consisting of a brush, a blade, a comb, a scrubber and any combination thereof.

A further object of the invention is to disclose the means for removing bees from said bee frames comprising air passages fluidly connectable to a source of compressed air configured for blowing off bees from said bee frames during removing thereof.

A further object of the invention is to disclose the means for removing bees from said bee frames comprising a heater configured for thermally repelling bees from said bee frames during removing thereof.

A further object of the invention is to disclose an automatic beehive for commercial beekeeping including honey production and pollination services. The aforesaid automatic beehive comprises: (a) a plurality of honeycomb brood frames and other frames in the hive releasably mounted within at least one hive chamber; (b) a mechanism for removing all kind of bee frames such as honeycomb or brood frames and other types of frames from said hive chamber and inserting said bee frames thereinto; (c) an automated honey harvesting arrangement; (d) an arrangement for monitoring hive and bees conditions, analyzing obtained data and reporting results to a user; and (e) an arrangement for feeding bees, pest and climate control. (f) An AI based decision making algorithm based on data gathered from the hives which will alert the user suggest and preform beekeeping practices within the unit in an automatic manner.

It is a core purpose of the invention to provide said beehive further comprises thermal *Varroa* mite diagnostic means.

Another object of the invention is to disclose the thermal *Varroa* mite diagnostic means selected from the group a thermal vision camera, a scanner, a visual light camera accompanied with a light source and any combination thereof configured for comb monitoring.

A further object of the invention is to disclose the thermal *Varroa* mite diagnostic means comprises a plurality of heat sensors embedded into said comb.

A further object of the invention is to disclose monitoring and diagnostic means comprising a plurality of optical sensors embedded into said comb.

It is hence one object of the invention to disclose an automatic beehive for commercial beekeeping including honey production and pollination services. The aforesaid automatic beehive comprises: (a) a plurality of honeycomb brood frames and other frames in the hive releasably mounted within at least one hive chamber; (b) a mechanism for removing all kind of bee frames such as honeycomb or brood frames and other types of frames from said hive chamber and inserting said bee frames thereinto; (c) an automated honey harvesting arrangement; (d) an arrangement for monitoring hive and bees conditions, analyzing obtained data and reporting results to a user; and (e) an arrangement for feeding bees, pest and climate control. (f) An AI based decision making algorithm based on data gathered from the hives which will alert the user suggest and preform beekeeping practices within the unit in an automatic manner.

It is a core purpose of the invention to provide said arrangement for monitoring bees conditions, analyzing obtained data and reporting results further comprises chemical Varroa mite diagnostic means.

Another object of the invention is to disclose the chemical Varroa mite diagnostic means comprises at least one chemical sensor mounted in proximity of said bee frames; said at least one chemical sensor is configured for diagnosing Varroa mite infection.

A further object of the invention is to disclose the chemical Varroa mite diagnostic means comprises a plurality of chemical sensors embedded into said comb.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice the art how the several forms of the disclosed subject matter may be embodied in practice.

In the drawings:

FIG. 2 illustrates several types of frames to be used in the unit shown in FIG. 1a;

DETAILED DESCRIPTION OF THE INVENTION

Figure 1A:
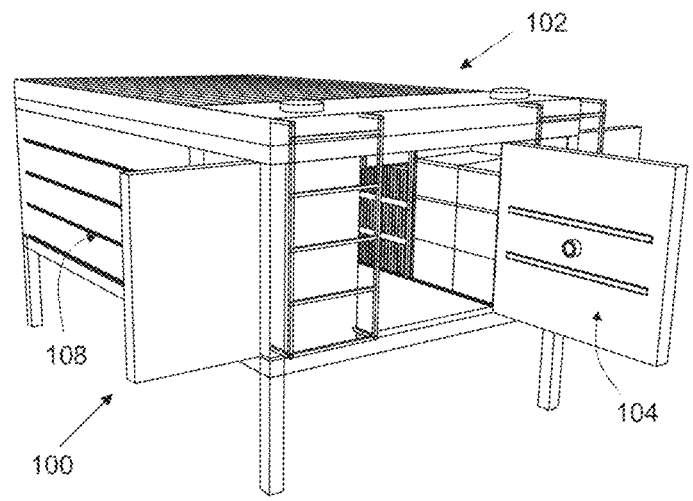
FIGS. 1a-1d illustrate an automatic unit of several beehives in several views and positions, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

A side-sliding configuration of hive chambers and frames (opposite to the standard top opening hives) allow for vertical stacking of hives and maximizing the amount of colonies served by the unit. The side-sliding extraction and insertion of frames, show-cased in the Beewise prototype for monitoring, is to be further developed to allow for frames relocation, limited compatibility to standard (Langstroth) hives and other types, and include feeder, queen excluder and partition frames. This development will support the automation of vast majority of beekeeping actions and practices. It will also allow for easy migration of colonies between traditional and Beehome platforms. The design objective is a box-frames system that includes all the different functioning frames in an unified automation-friendly form-factor, based of standard (Langstroth) frame size for limited compatibility. In order to achieve this, additional materials are to be examined for use that is not use in hive chambers traditionally (such as silicones, soft plastics and polymeric foams (existing hive chambers and frames implement wood, rigid plastics and metals).

An XYZ Cartesian robot is at the base of the system used to manipulate the different frames in the hive chamber. An additional 180 degrees rotary axis for two sided hive-array service and two sided visual monitoring is introduced. A combination of electric linear modules (belt and ball-screw driven) and pneumatic linear cylinders and grippers are used to achieve the best results considering the required precision, speed, force, durability, energetic efficiency and cost.

Custom designed end unit ('frame loader') to deliver considerable tolerance in positioning (to overcome the biological variability in the hives) and control the bees allocation while manipulating frames in the hives. All while keeping clear sight for visual monitoring and keeping honey and wax away from mechanical parts.

The data relating to the colonies is collected using a variety of off-the-shelf sensors. The key one being a camera or scanner module chosen with suitable optics and lighting to produce the best images as raw data for image processing. The optical sensor is supplemented with load cell and in-hive environmental sensors (temperature, sound and humidity). RFID tagging of the frames is considered for more efficient data management in the system and improved storage and logistics management for the user. Environmental sensors are also implemented to track the conditions in the unit and outside to drive the climate control system and ensure proper conditions in the unit. The units systems (robot, feeding, solar-power etc.) are self-monitored using the relevant standard industrial sensors (such as inductive switches, liquid level switch, load cells, etc.)

The product contains off-the-shelf industrial level CPU and I/O controllers to perform the on-board computation, actions control and data acquisition.

Reference is now to FIGS. 1a-1d illustrating an automatic unit of several beehives in several views and positions, in accordance with some exemplary embodiments of the disclosed subject matter. Automatic beehive 100 is an enclosure 102 provided with brood, super, and other chambers sized to fit the needs of the colony, as will be elaborated herein after. Beehive 100 has several openings for different purposes. At the front side, a main opening with a door 104 is provided so that a beekeeper or technician can reach the interior of the enclosure 102, while optionally, additional two service openings can be provided with doors 106 on the sides of the enclosure, in order to collect honey, honey combs, old/damaged frames, add new frames etc. Bee passage holes 108 are provided preferably to the sides of the enclosure, were the bees are intended to be accommodated. The holes 108 can be provided in different shapes, orientations, and sizes, without limiting the scope of the subject matter.

Figure 1B:
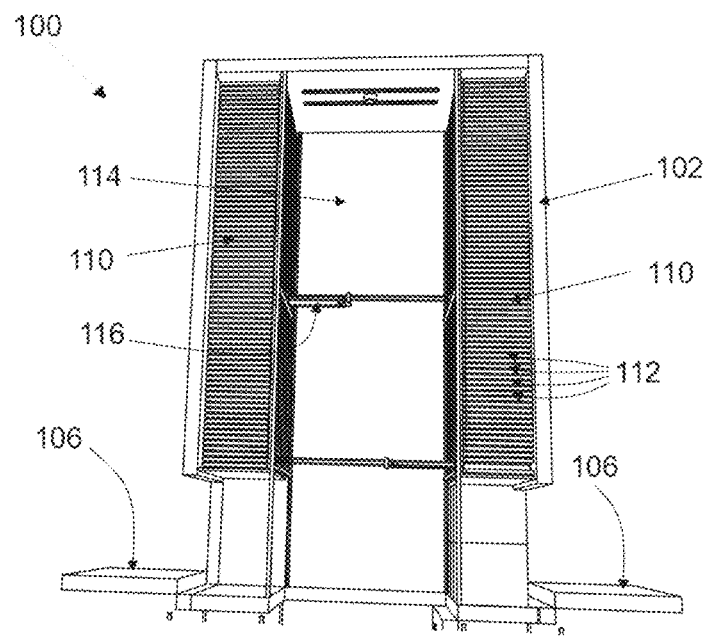
Figure 1C:
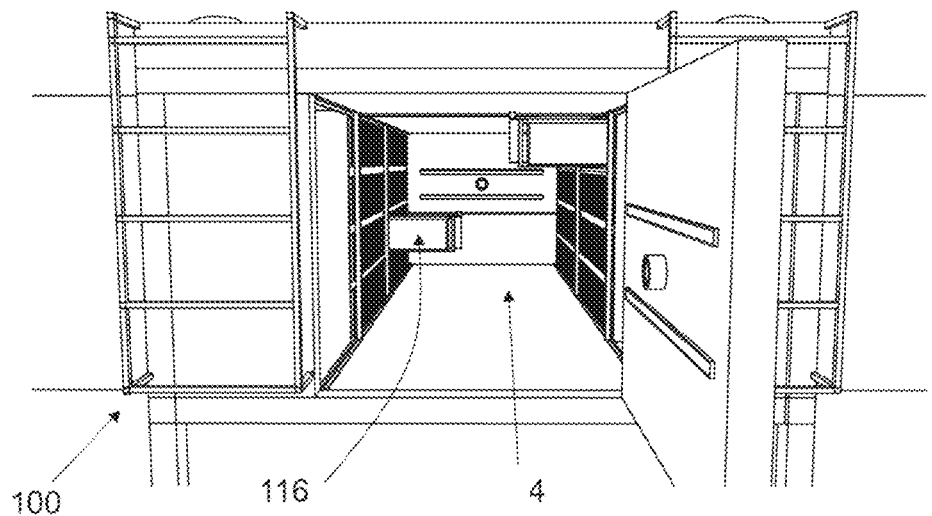
Figure 1D:
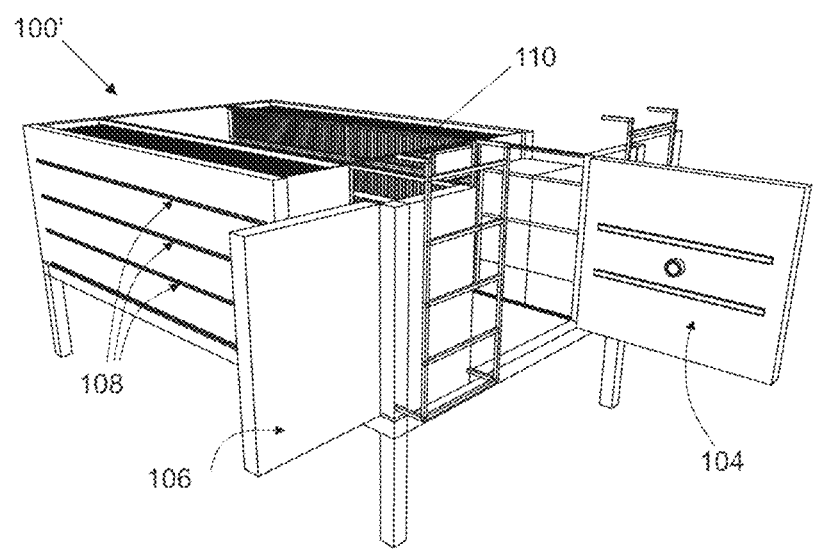

FIG. 1b is a top view of the automatic unit of several beehives 100 while the roof of the enclosure is removed in order to be able to observe the interior order of the different chambers of the enclosure 102. The enclosure sides comprise horizontal rows of slots that can receive plurality of frames 112 depicted in FIG. 2. Alternatively, and optionally, several floors of frames can be organized one on top of the other as can be seen in FIG. 1c. Each of the plurality of frames 112 can be removed from its slot and returned to it.

The frames are separated from one another allowing a gap of air between them so as 10 to allow space for the bees to be accommodated and build the honeycombs on the frames, usually about 4-9 mm between the frames should suffice for the bees.

Additionally, and preferably, the unit is provided with an air control system (not shown in the figures) that monitors characteristics or the beehive interior environment such as but not limited to temperature, humidity, allergens etc.

Additionally, and preferably, containers of sugar and water are provided on top of the beehive or in any other place suitable for it. Additionally, and preferably, the beehive is provided with wheels so it can be easily transported from one site to the other.

Figure 2:
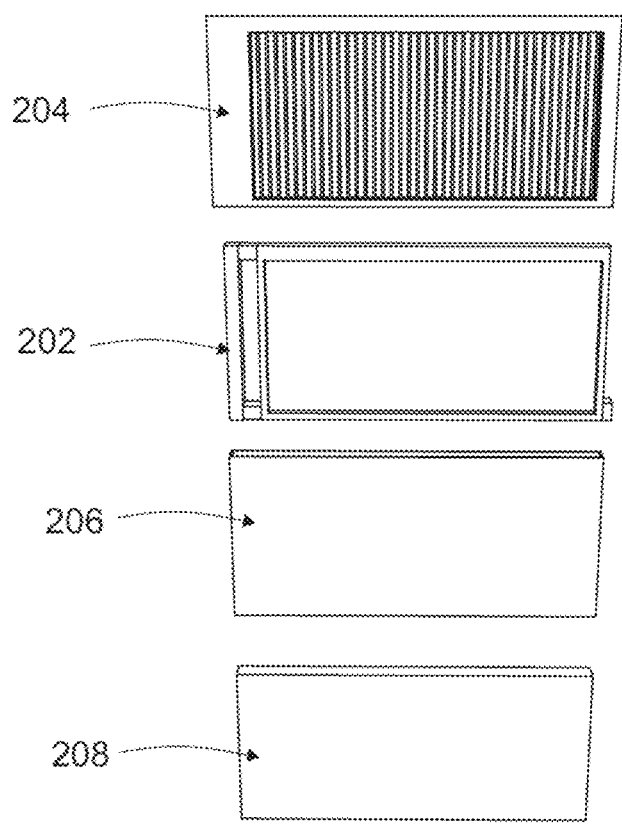

Reference is now made to FIG. 2 illustrating several types of frames to be used in the unit of several beehives shown in FIG. 1a. Most of the frames in the beehive are comb frames such as frame 202. Frame 202 is similar to a standard comb frame and is design to allow the bees to brood and build the honeycomb. It should be mentioned that each honeycomb comprises a plurality of hexagonal prismatic wax cells that are built by the community of honey bees in which their larvae and stores of honey and pollen are placed. The differentiation between the cells is crucial in the honey harvesting process, and monitoring the comb frames is needed in order to get as much information as needed.

Returning to FIGS. 1b and 1c, one can observe other chambers in the enclosure 102. Between the two rows of bee chambers 110, a monitoring and operating chamber 114 is provided in which at least one comb frame can be monitored so as to collect information. In order to monitor a frame of the plurality of frames, the frame to be examined 116 is removed from its place to the monitoring chamber 114 for inspection. The inspection can be performed by a variety of methods such as scanning, photographing, or any other method by which the surface of the honeycomb on the frame 116 is being imaged, after which image processing can optionally be employed in order to infer and differentiate the contents of the vast number of cells. In FIG. 1c, one can see more than a single frame to be examined in extracted from its positioning into the monitoring chamber 114.

Since the frames can be automatically removed from their slots to be examined and treated, they can be harvested in case the image processing system results indicate that the frame is ready for harvesting. Honey can be collected from frames that are ready for harvesting.

Figure 3:
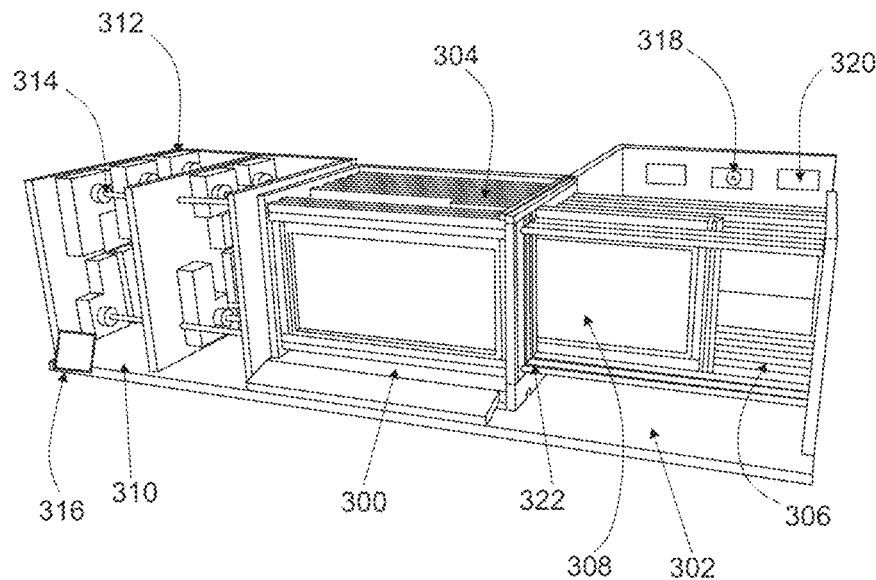
FIG. 3 illustrates an interior view of an automatic beehive in accordance with an exemplary embodiment of the disclosed subject matter.

Reference is now made to FIG. 3 illustrating a cut through a portion of the automatic beehive in accordance with some exemplary embodiments of the disclosed subject matter. A hive chamber 300 is situated adjacent to a monitoring chamber 302. The hive chamber 300 comprises a plurality of frames 304 that are vertically placed one near the other in a row, as shown herein before. Opposite the frames, in the monitoring chamber 302, a set of rails 306 is provided. The set of rails 306 is organized to form slots, wherein each of the slots is capable of receiving an oppositely positioned frame. It is illustrated in the figure that one comb frame 308 is extracted from the hive chamber 300 into the monitoring chamber 302 through a corresponding slot. The frame can be extracted and retracted back to its position using a displacement system.

In this embodiment, in FIG. 3, the displacement system is positioned in an actuating chamber 310 that is adjacent to the hive chamber 300 and comprises one or more motors 312 and pushing rods 314. Other displacement systems can be used without limiting the scope of the disclosed subject matter. Optionally, a controller 316 that is electrically connected and controls the engines and the rods movements is provided so as to ensure proper functioning of the system is provided. The controller 316 can be placed within the actuating chamber 310 or in any other part of the beehive as well as externally placed. It is also possible to use wireless connection between the controller and the displacement system.

The frame 308 in the monitoring chamber 302 is being monitored preferably using a camera 318 that is preferably attached to the side of the monitoring chamber 302 and is directed to image an oppositely positioned frame. The camera 318 can be any optical sensor that converts light into electrical signal such as photoconductive devices. In case light is necessary for the imaging process, illumination is provided. At least one illuminator 320 is provided adjacent to the camera 318. The illuminator can be LED, laser, or any other type of lighting. Information regarding the data processing will be explained hereinafter.

The frames 308 are extracted from the hive chamber 300, where the community of bees is working. In order to prevent withdrawal of the bees from the hive chamber while the comb frame is extracted, the exit area is provided with barriers 322 that can be a full surface or has brush like structure from both sides of the frame that prevents the bees from exiting the hive chamber. Returning to FIG. 2, additional types of frames are provided. Queen excluder 204 is built according to the characteristics of the system; however, it accords the queen excluders that are provided in the art. In the same manner, a feeding frame 206 and a separator 208 are provided to separate between different sub-chambers of the bee chamber 110. Placement and displacement of separator 208 and queen excluder 204 allow varying the number of frames allocated for each colony in the unit, as well varying the size of the brood and honey chambers of each individual colony.

All types of frames are removable and can be extracted and retracted from their positioning from different reasons such as changes in the beehive structure and size, treatment of a unique frame, monitoring the comb frames, or any other maintenance action.

Figure 4:
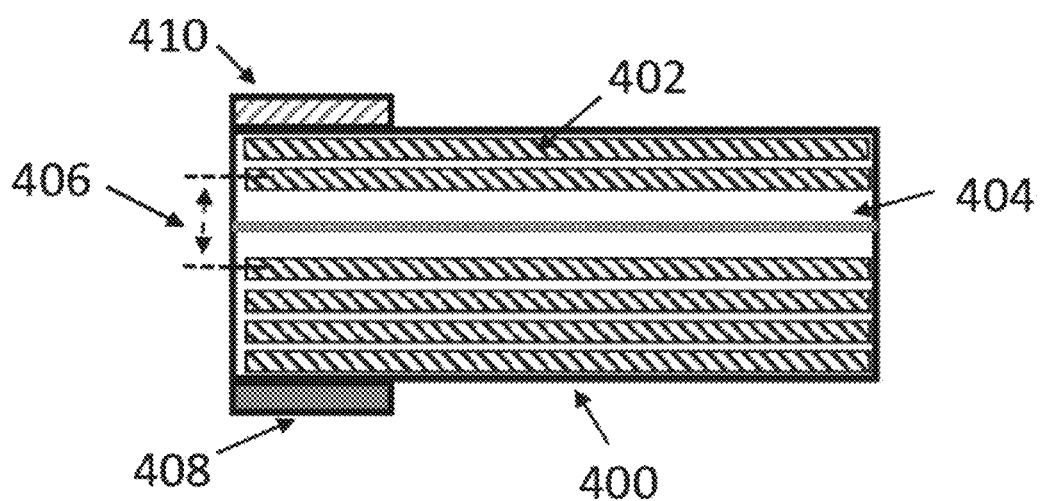
FIG. 4 illustrates comb frame monitoring system in accordance with an exemplary embodiment of the disclosed subject matter.

Monitoring the comb frames can be performed using several other embodiments as follows:

Reference is now made to FIG. 4 illustrating comb frame monitoring system in accordance with some exemplary embodiments of the disclosed subject matter. An upper view of a portion of a hive chamber 400 is provided with several comb frames 402. A scanning or imaging device, an imager 404 is provided between the frames 402 so it can image the surface of the frame. In order to allow the imager 404 to be positioned between the frames 402, the two frames from both sides of the device should be moved apart so as to increase the gap 406 that normally exists between the frames. Preferably, two actuators are provided. A first actuator 408 is provided so as to move the frames so as to allow the imager to have a sufficient gap between them and a second actuator 410 is provided so as to move the imager 404 from one gap to the other. Both actuators 408 and 410 can be positioned in any area of the chamber 400 or the beehive.

Figure 5:
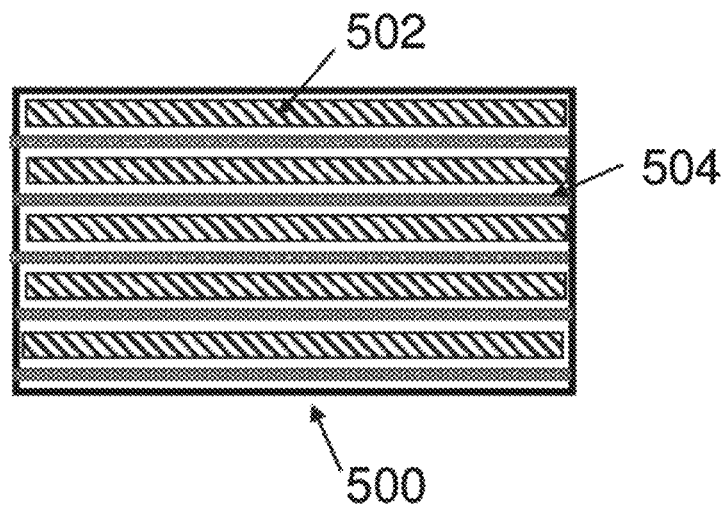
FIG. 5 illustrates comb frame monitoring system in accordance with an exemplary embodiment of the disclosed subject matter.

Reference is now made to FIG. 5 illustrating another comb frame monitoring system in accordance with some exemplary embodiments of the disclosed subject matter. An upper view 5 of a portion of a hive chamber 500 is provided with several comb frames 502. A plurality of scanning or imaging device, each imager 504 is provided between two adjacent frames 402 so it can image the surface of the two frames that faces each other.

Figure 6:
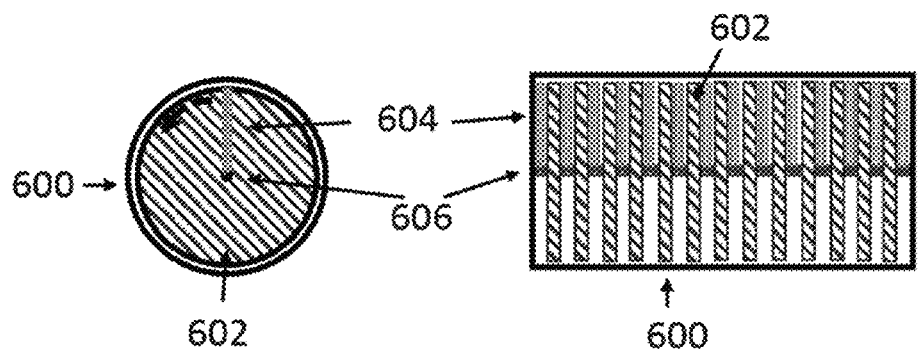
FIG. 6 illustrates yet another comb frame monitoring system in accordance with an exemplary embodiment of the disclosed subject matter.

Reference is now made to FIG. 6 illustrating yet another comb frame monitoring system in accordance with some exemplary embodiments of the disclosed subject matter. A side view (right hand side) and frontal view (left hand side) of a cylindrical hive chamber 600 is illustrated. Hive chamber 600 is built as a cylinder so that rounded comb frames 602 are arranged one beside the other. A plurality of imagers 604 is provided between each pair of adjacent frames while the imagers are rotating about an axis 606. In the frontal view, one can see that the imager 604 is a line imager that rotates according with the arrow and scans the full area of the frame 604.

Figure 7:
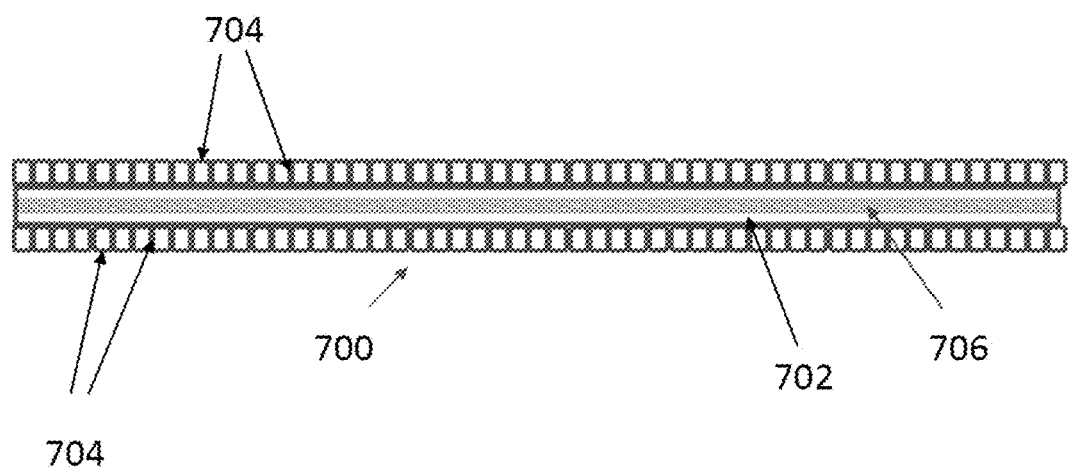
FIG. 7 illustrates additional comb frame monitoring system in accordance with an exemplary embodiment of the disclosed subject matter.

Reference is now made to FIG. 7 illustrating additional comb frame monitoring system in accordance with some exemplary embodiments of the disclosed subject matter. An upper view of a single frame is shown in the figure. The comb frame 700 comprises a middle compartment 702 while on both opposite surfaces of the comb frame 700, cells of honeycomb 704 are built by the bees. Imager 706 is provided within the inner compartment 702 so that it can provide images of the honeycomb cells 704.

Figure 8:
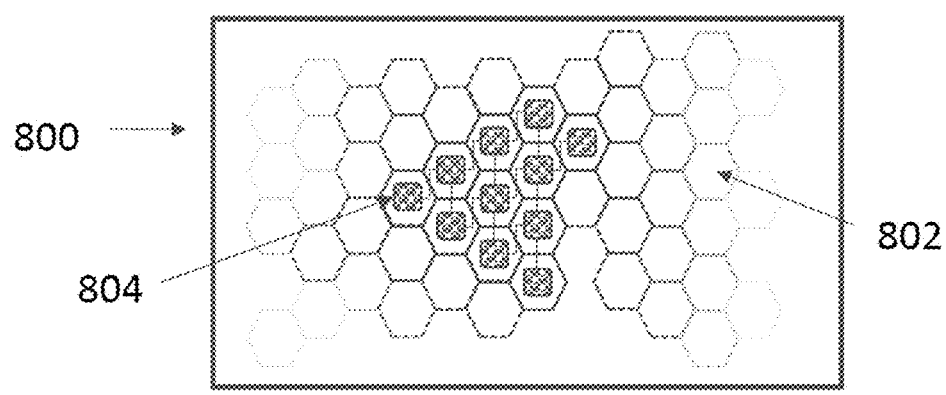
FIG. 8 illustrates yet additional comb frame monitoring system in accordance with an exemplary embodiment of the disclosed subject matter.

Reference is now made to FIG. 8 illustrating yet additional comb frame monitoring system in accordance with some exemplary embodiments of the disclosed subject matter. A frontal view of a portion of a comb frame 800 is shown to have honeycomb cells 802 on its surface. Each cell 802 is provided with a miniature sensor 804 that images the interior of the cell and provides information on the cell content.

Figure 9:
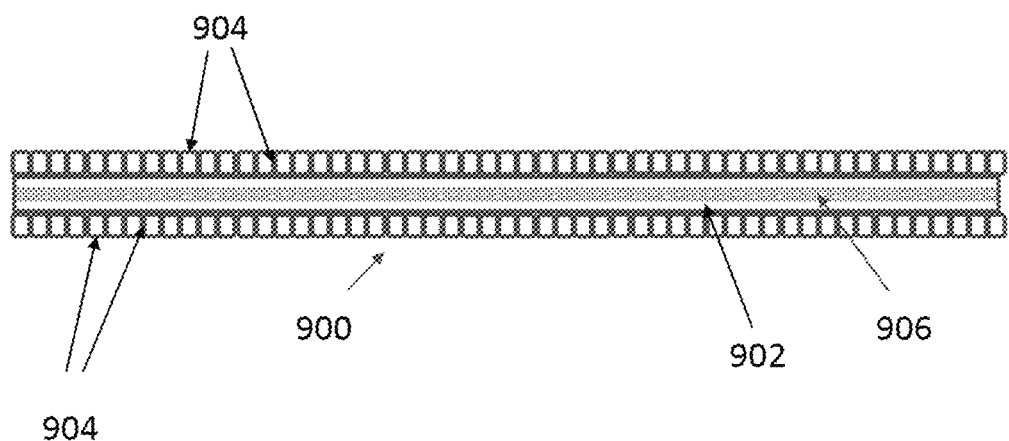
FIG. 9 illustrates comb frame illumination system in accordance with an exemplary embodiment of the disclosed subject matter.

Reference is now made to FIG. 9 illustrating comb frame illumination system in accordance with some exemplary embodiments of the disclosed subject matter. An upper view of a single frame is shown in the figure. The comb frame 900 comprises a middle compartment 902 while on both opposite surfaces of the comb frame 900, cells of honeycomb 904 are built by the bees. Illuminator 906 is provided within the inner compartment 902 so that it can provide improved image quality when an imager images the honeycomb. It should be mentioned that this type of inner illumination that is not producing heat within the frame can be used for any one of the previous illustrated imager embodiments. As mentioned herein before, in order to allow automatic beehives to function, data and information should be collected from the beehive so as to be able to provide treatment to the bees and the honey produced in the beehive. As indicated, monitoring the frames and the honeycomb cells is performed in or out of the hive chamber. Data is collected per cell as to the content of each cell, while bearing in mind that there are thousands of cells in a beehive. Each cell can be as followed: empty, contains bee stages in the phase of an egg, larvae, a sealed larvae, queen larvae and droon larvae or contains pollen, honey, or sealed honey. Integrating information regarding the cells contents, one can infer regarding the fertility of the queen, swarming, diseases, existence of parasites, a combination thereof and the like. Imaging of the surface of the honeycomb can provide vast amount of information.

Figure 10A:
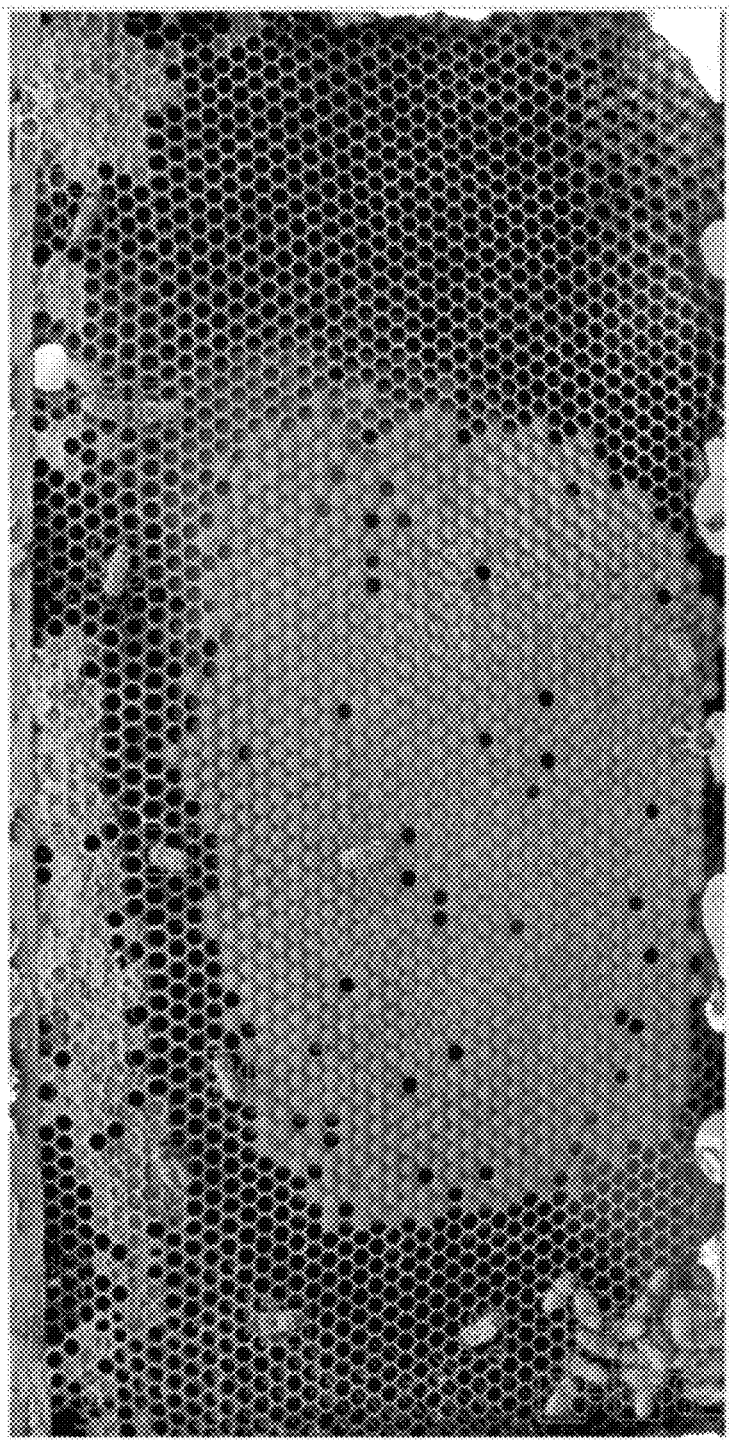
FIG. 10a depicts an image of a honeycomb which is a mass of hexagonal prismatic wax cells built by honey bees in their nests to contain their larvae and stores of honey and pollen, on a comb frame onto which image processing was performed in accordance with an exemplary embodiment of the disclosed subject matter.

Reference is now made to FIG. 10a depicting an image of a honeycomb on a comb frame onto which image processing was performed in accordance with some exemplary embodiments of the disclosed subject matter. The image comprises the differentiation between different types of cells in the honeycomb as well as showing were the bees are situated. As examples, sealed larvae cells are shown in pink circles, sealed honey cells that are ready to be harvested are shown in green circles, and bees are shown in blue squares. Image processing can also identify pests in the cells or on the honey comb surface such as the Varroa *Distractor* mite.

Figure 10B:
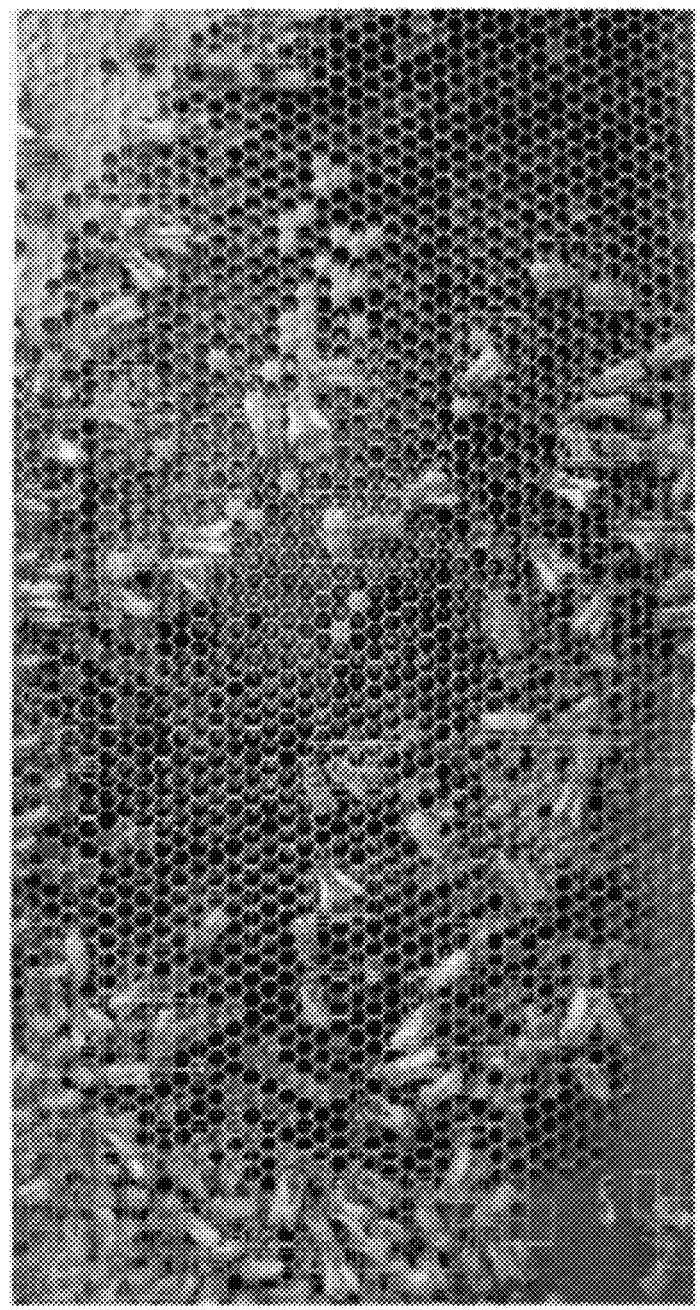
FIG. 10b depicts another image of a honeycomb on a comb frame onto which image processing was performed in accordance with an exemplary embodiment of the disclosed subject matter.

Reference is being made to FIG. 10b depicting another image of a honeycomb on a comb frame onto which image processing was performed in accordance with some exemplary embodiments of the disclosed subject matter. In this image, only bees are detected and taken into account as data. Upon receiving the data from the imaging and processing systems, appropriate actions should be taken, if necessary, such as but not limited to disinfecting the honeycomb, removing frames, removing bees, imaging a specific frame as non-schedule action, harvesting honey, moving frames from one colony to the other, moving the queen excluder and the brier frame, feeding sugar syrup, heating or cooling the unit, applying pesticides, removing unwanted queen larvae cell, adding a queen, replacing a queen etc. The monitoring chamber can act also as a disinfecting and/or treatment chambers. It should be mentioned that the chambers can be separated or combined in any combination.

Figure 11:
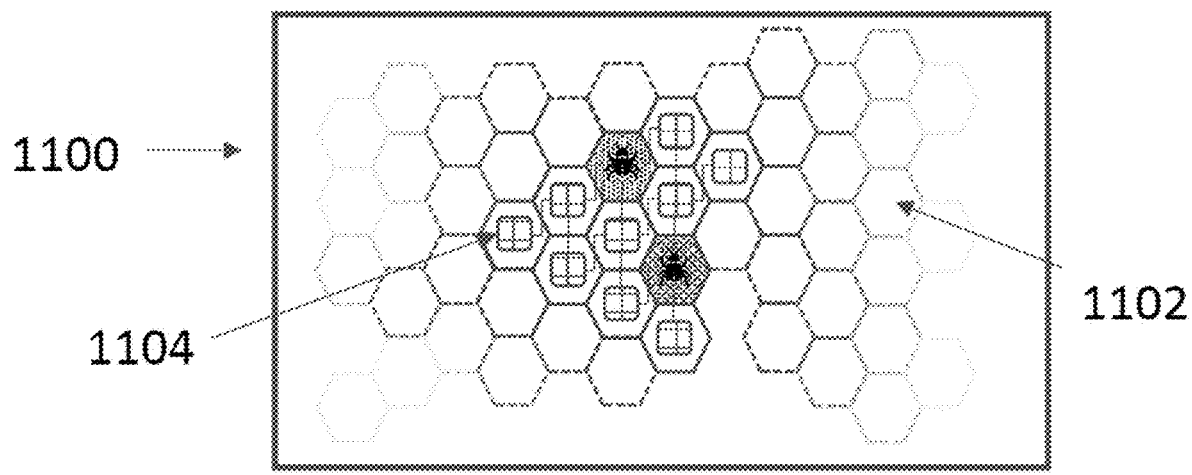
FIG. 11 illustrates a portion of a honeycomb provided with a disinfecting system in accordance with an exemplary embodiment of the disclosed subject matter.
Figure 12:
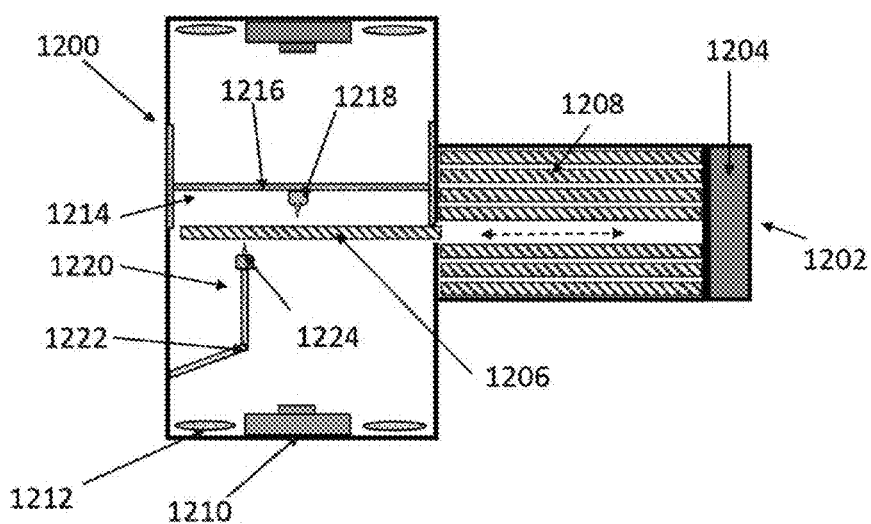
FIG. 12 illustrates an upper view of a monitoring and disinfecting chamber adjacent a beehive chamber in accordance with an exemplary embodiment of the disclosed subject matter.

Reference is now made to FIG. 11 illustrating a portion of a honeycomb provided with a disinfecting system in accordance with some exemplary embodiments of the disclosed subject matter. Each cell 1102 of the honeycomb 1100 is provided with a miniature heater 1104 while the heaters of all cells are electrically connected to a common controller (not shown in the figure) that is configured to control the heating of a specific or several cells if detected to be infected with a parasite that can be destroyed by applying sufficient heat. Reference is now made to FIG. 12 illustrating an upper view of a monitoring and disinfecting chamber adjacent a hive chamber in accordance with some exemplary embodiments of the disclosed subject matter. A monitoring and disinfecting chamber 1200 is adjacent to a hive chamber 1202 of an automatic beehive. Actuating system 1204 is adjacent to the hive chamber 1202, wherein the actuating system is configured to push a single comb frame 1206 of the plurality of frames 1208 that are aligned in the hive chamber 1202 into the monitoring and disinfecting chamber 1200 at a time. The actuating system 1204 is configured to push the frame into the monitoring and infecting chamber in order to be examined or in order to be treated. As mentioned herein before, a monitoring chamber is preferably provided with at least one camera 1210 directed towards the extracted frame 1206 and illuminators 1212, also directed towards the extracted frame 1206. Since honeycombs are built on two surfaces of the frame, the camera and illuminators are provided on both sides of the chamber. The monitoring and disinfecting chamber 1200 is provided also with disinfecting means that are operated immediately after a detection of a parasite or other problem in a specific cell, or can be operated after all frames are imaged.

FIG. 12 illustrates two types of disinfecting systems, operating on both sides of the frame 1206. Any combination of the systems or other such systems is possible without limiting the scope of the disclosed subject matter. Disinfector system 1214 is provided with a supporting board 1216 that is configures to move along the sides of the monitoring and disinfecting chamber 1200 so as to get distant and closer to the extracted frame 1206 and a disinfecting head 1218 that is provided with a pointing edge that can physically puncture the cell, in case it is sealed, and treat the cell through the pointing edge using optical or chemical means, a combination thereof and the like in order to treat a specific cell. On the other side of the extracted frame 1206, another disinfector system 1220 is provided. A disinfector head 1224 is mounted on an arm 1222, that can be a robotic arm, that directs the disinfector head 1224 to a specific location opposite a specific cell that needs treatment. The disinfector head is provided, similarly to the disinfector head 1218, with a pointing edge that can treat by physical or chemical methods, a combination thereof or the like, the honeycomb in the level of a single cell.

Figure 13:
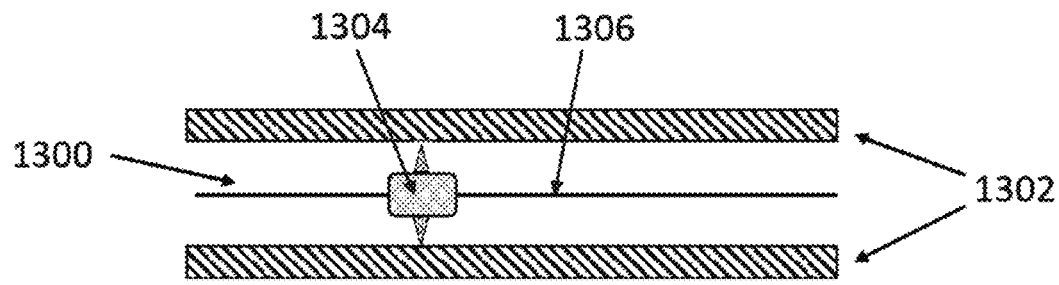
FIG. 13 illustrates an upper view of a disinfecting system in accordance with an exemplary embodiment of the disclosed subject matter.

Reference is now made to FIG. 13 illustrating an upper view of a disinfecting system in accordance with some exemplary embodiments of the disclosed subject matter. Disinfecting system 1300 is configured to be positioned between two adjacent frames 1302. A disinfecting head 1304 is moving along a string 1306 from left to right and vice versa in order to be positioned in the correct positioning for disinfecting a specific cell while the string can move up and down so the whole surface of the frame is covered and can be reached by the disinfector head. The disinfector head 1304 is provided with two pointing edges on both sides so as to reach each one of the facing one another honeycomb cells.

In this embodiment, the disinfecting system can be incorporated within an imager that is provided as well between the frames and was shown herein in FIG. 5 or 6, as examples.

Figure 14:
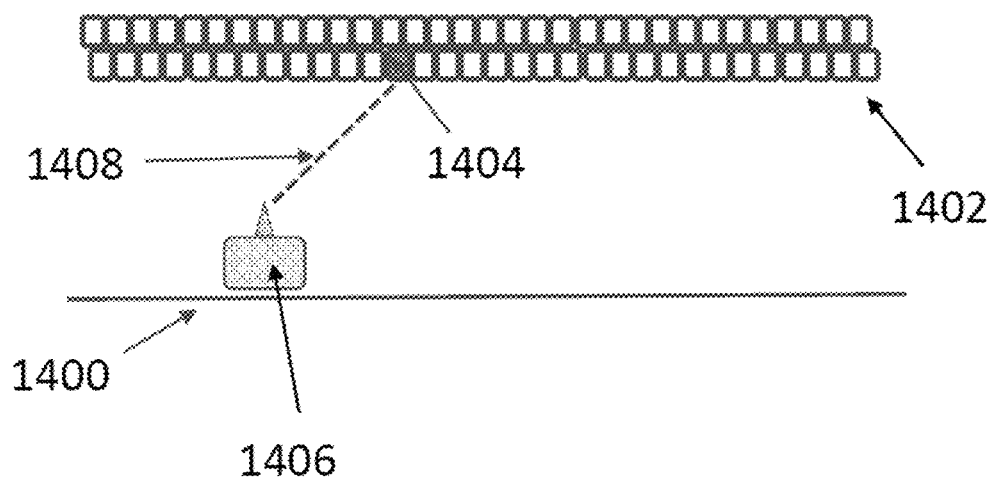
FIG. 14 illustrates an upper view of another disinfecting system in accordance with an exemplary embodiment of the disclosed subject matter.

Reference is now made to FIG. 14 illustrating an upper view of another disinfecting system in accordance with some exemplary embodiments of the disclosed subject matter. A disinfecting system 1400 is positioned in a single spot in a disinfecting chamber opposite a bee frame 1402. As already noted, the comb frame is provided with built up of honeycomb on the surface of the frame, on both sides. When a specific cell 1404 is detected to be infected, it has to be treated. Disinfecting system 1400 is provided with a rotating head 1406 that can direct a coherent ray such as laser 1408 to the specific cell 1404 that needs treatment and heat it in order to disinfect the cell. This disinfecting system can be employed in any adequate scanning or imaging systems and can also be mobile and positioned in any positioning in the monitoring and disinfecting chamber.

Figure 15:
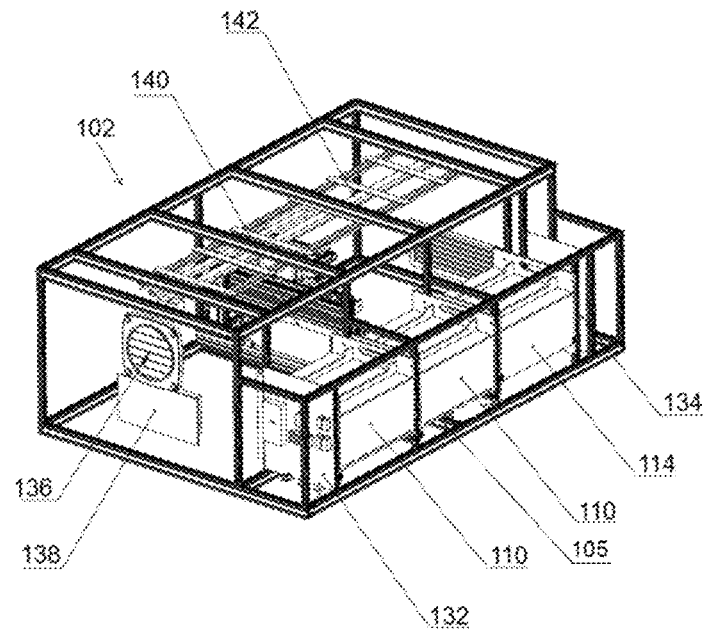
FIG. 15 is an isometric view of a unit of several beehives enclosure with a frame loader.

Reference is now made to FIG. 15 presenting an internal isometric view of unit of one or several beehives enclosure 102. Frame loader 140 is displaceable along main axis 142 which is parallel to a face (not shown) of hive chambers 110. Numeral 136 refers to a vent creating an air flow into/out of the beehive. Camera 138 captures images of bee frames and transmits obtained images to control unit which is configured for analyzing them in terms of bees conditions, honey harvesting and pest control. The results of the carried out analysis are reported to a user. Camera 138 is provided with a light source for illumination of the bee frames during capturing their images.

Numeral 150 refers to an opening for the bees exiting or entering the hives, 105 The opening is divided into segments which can be either open or closed. Each segment of the opening has a bar running underneath the hive chamber which can be pushed or pulled by the cartesian robot, thus controlling whether the segment is open for the passage of bees or closed. Thus, the location and number of open and closed segments is controlled from within the unit by the cartesian robot or another mechanism.

Figure 16:
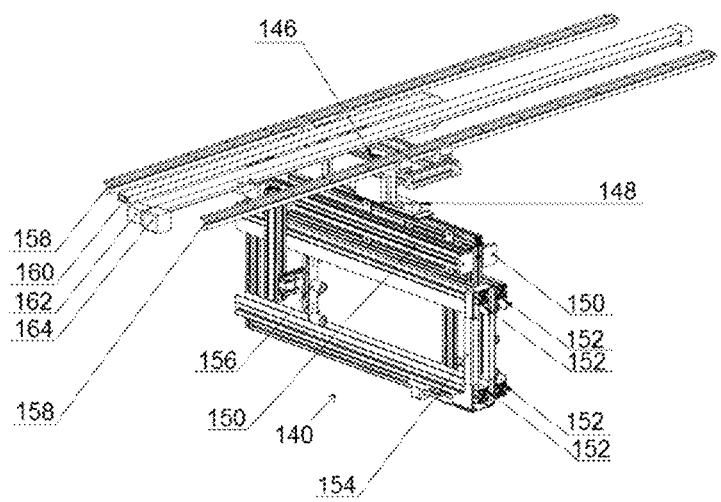
FIG. 16 is an isometric enlarged view of a frame loader.

Reference is now made to FIG. 16 presenting an enlarged isometric view of the frame loader. A bee frame (not shown) is placeable into frame holder 140 which is displaceable along main axis rails 158 by stepper motor 164 by means of drag chain and linear drive belt 160 and 162, respectively. Frame loader 140 is connected to rails 158 via rotating table 146. The bee frame is movable along loader rails 152 via loader gate 154 and securable by gripper 156. Linear displacement along rails 152 is carried out by ball screw linear actuators 150.

Figure 17A:
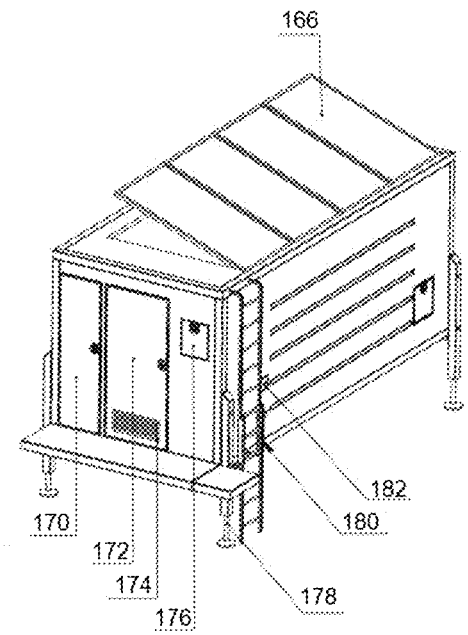
FIGS. 17a and 17b are external views of a unit of several beehives.
Figure 17B:
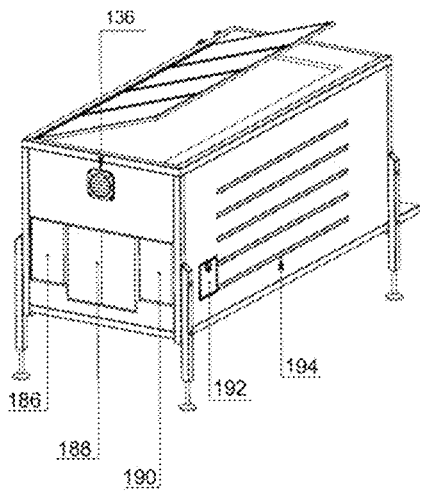

Reference is now made to FIGS. 17a and 17b presenting external views of the beehive. Specifically, a level of the beehive is adjustable by means support members 178. A honey tank access and a service door are indicated by numerals 170 and 172 respectively. Service door 172 is provided with vent slits 174. Sugar loading is performed via port 176. Solar panel array is used as an alternative source of energy together with electric batteries 186. Water and pesticides are loaded via port 182. Numeral 180 refers to a service ladder. Opening and porches 194 are designed for landing bees and entering and exiting the hive.

The opening is divided into segments, which can be either open or closed. Each segment of the opening has a bar running underneath the hive chamber which can be pushed or pulled by the cartesian robot, thus controlling whether the segment is open for the passage of bees or closed. Thus, the location and number of open and closed segments is controlled from within the unit by the Cartesian robot or another mechanism.

Tools cabin and interface chamber are indicated by numerals 190 and 192, respectively.

Figure 18A:
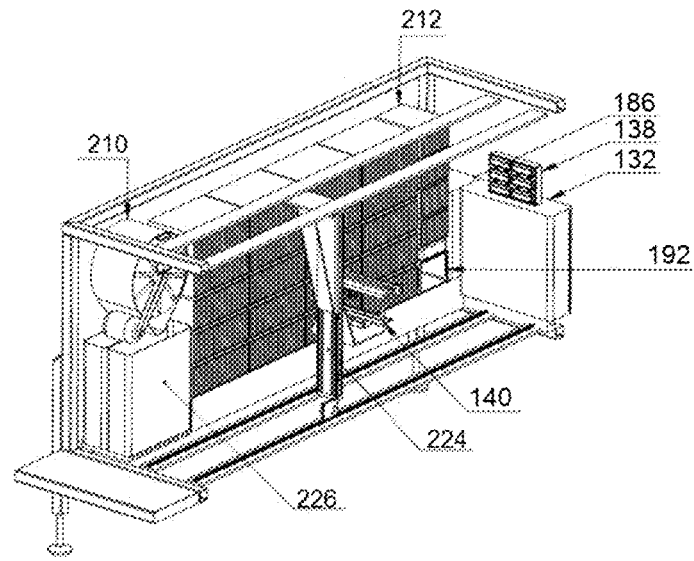
FIGS. 18a and 18b are internal views of a unit of several beehives.
Figure 18B:
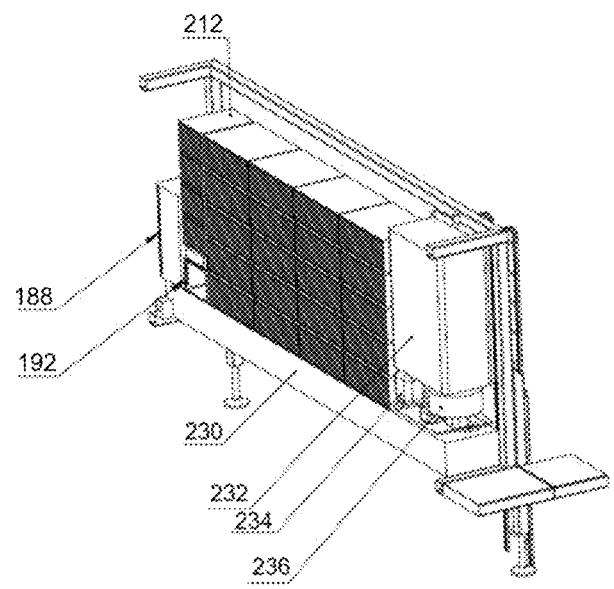

Reference is now made to FIGS. 18a and 18b presenting internal views of the beehive. Bee frames are stored in store 212. Honey harvested by centrifugal machine 210 is stored in honey tank 226. Frame loader 140 is two-axis displaceable by Cartesian XY robot 224. Tanks 230, 232 and 234 accommodate water, sugar and pesticides, respectively. The aforesaid materials are mixed in mixer 236.

Figure 19A:
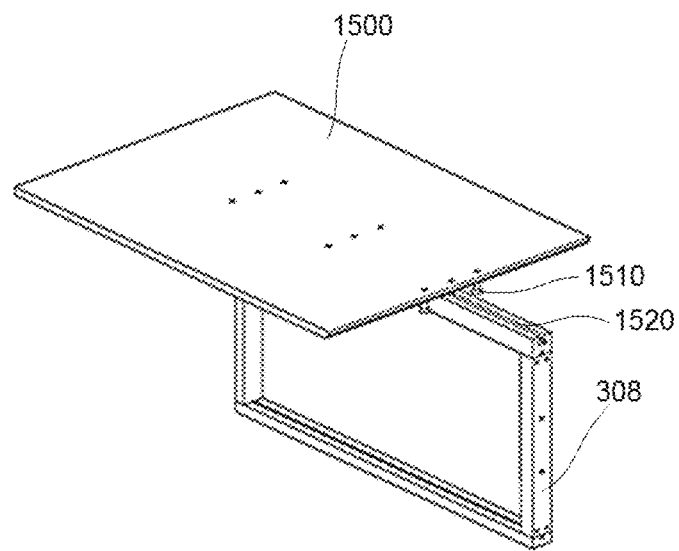
FIGS. 19a to 19c are isometric, side and front views of a first embodiment of an arrangement for releasably securing bee frames.
Figure 19B:
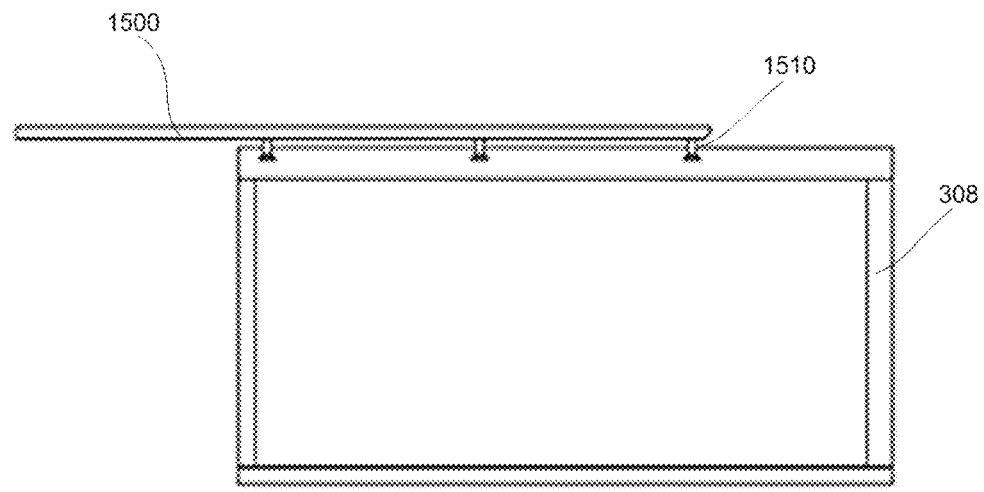
Figure 19C:
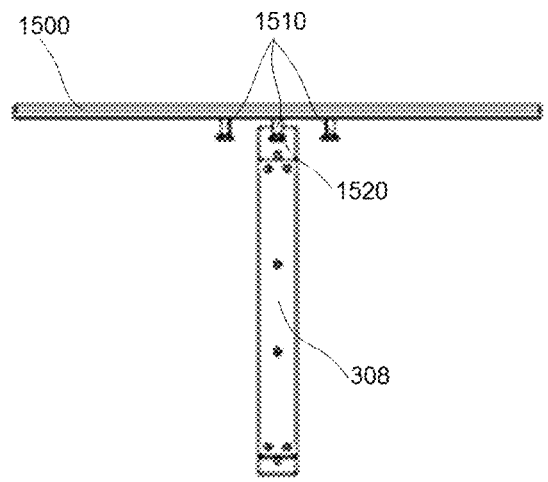
Figure 20A:
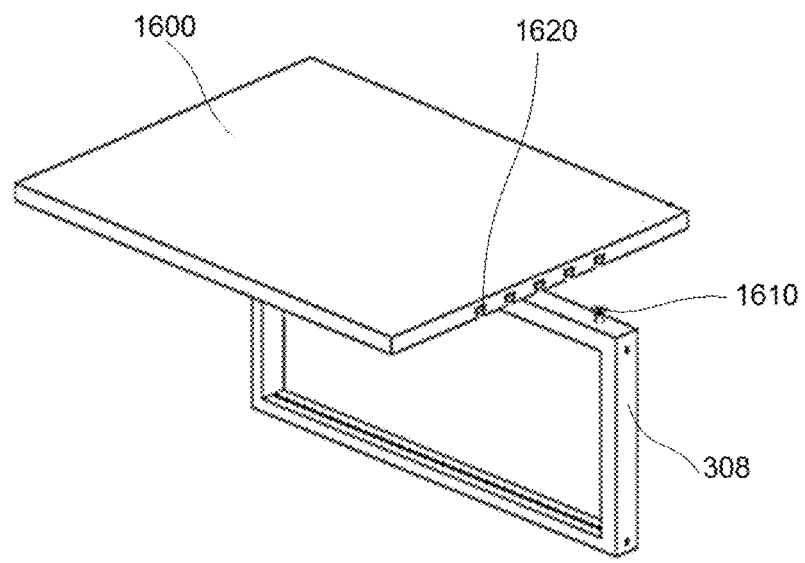
FIGS. 20a to 20c are isometric, side and front views of a second embodiment of an arrangement for releasably securing bee frames.
Figure 20B:
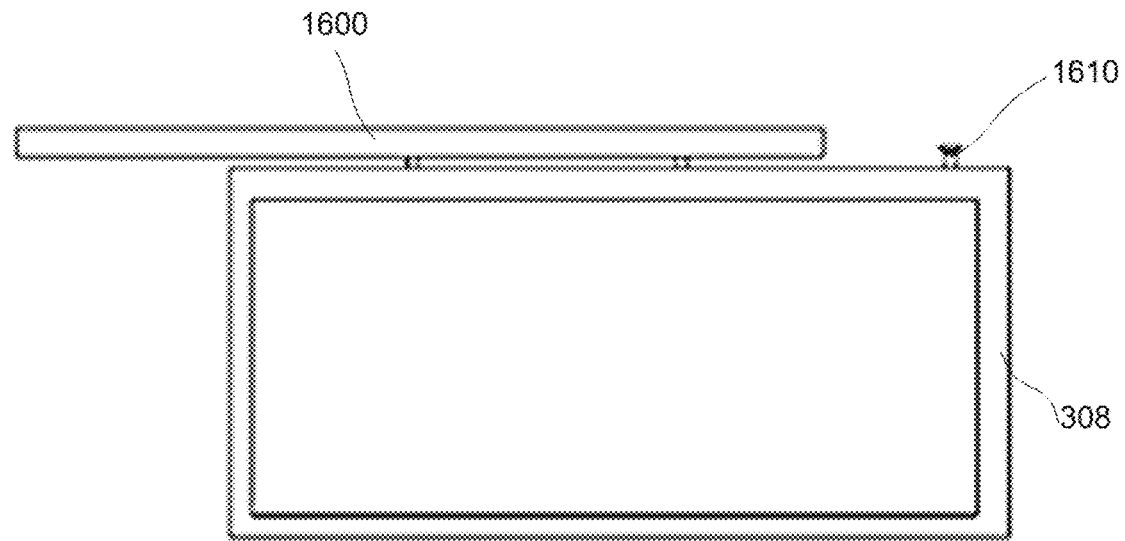
Figure 20C:
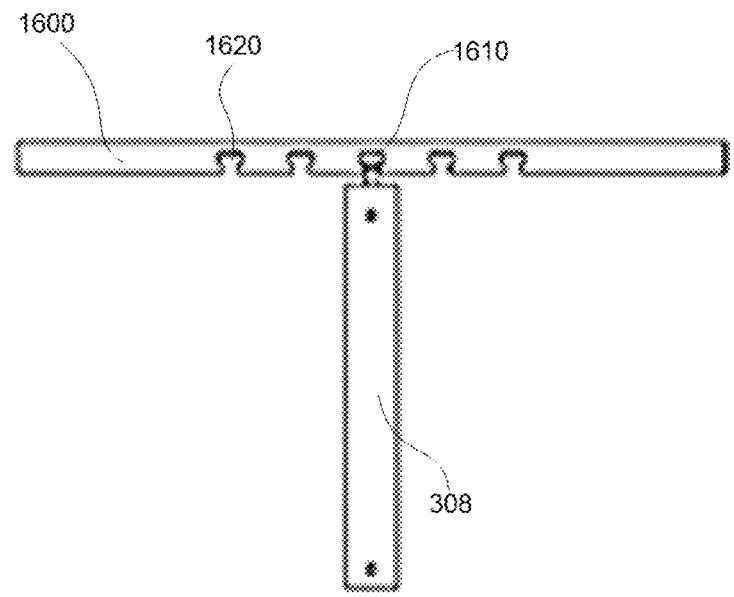

Reference is now made to FIGS. 19(a-c) and 20(a-c) presenting isometric, side and front views of first and second embodiments of a hanging arrangement configured for releasable securement of bee frame 308 to base plate 1500/1600. In the first embodiment shown in FIGS. 19(a-c) bee frames 308 is provided with t-slot while base plate 1500 has t-head connecting elements which are releasably securable within the aforesaid t-slot.

According to the second embodiment of the hanging arrangement, a plurality of t-slots are machined within base plate 1600 and t-head connecting elements 1610 carried by—head connecting elements are releasably securable within t-slot 1620.

According to the present invention, the arrangement for removing and inserting the bee frames includes bee-barrier members configured for individually embracing said bee frames such that each bee frame passes through said member. While replacement of the bee frames is performed, bees maintained within said beehive are prevented from escaping from said beehive during replacement of said frames. Each of said bee-barrier member is provided with means for removing bees from said bee frames during removing thereof from said beehive.

Figure 21A:
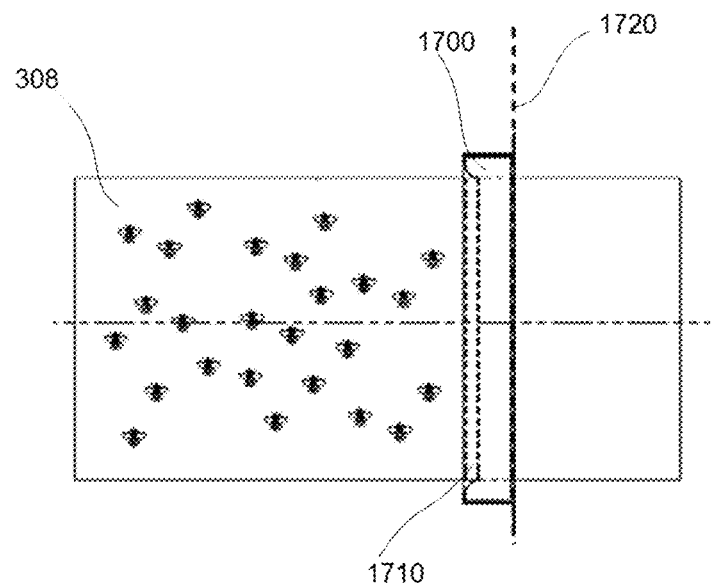
FIGS. 21a to 21c are side, isometric and enlarged top views of a bee-barrier member provided with mechanical brushes.
Figure 21B:
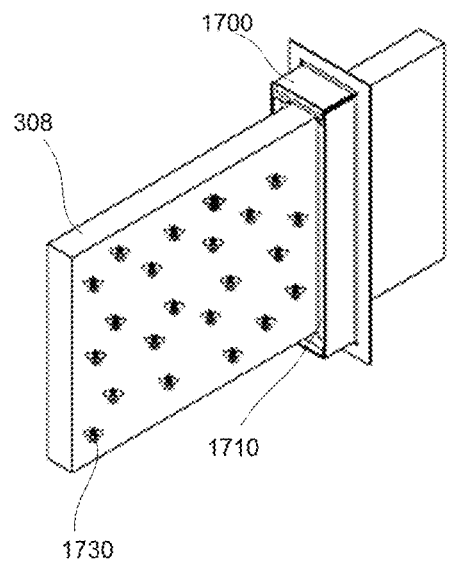
Figure 21C:
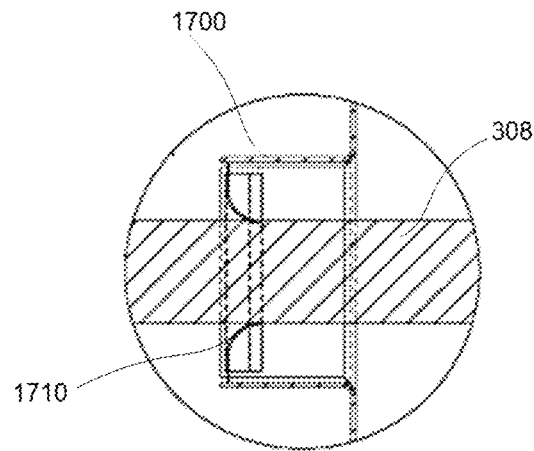

Reference is now made to FIGS. 21a to 21b presenting side, isometric and enlarged top views of a bee-barrier member provided with mechanical brushes.

Specifically, bee-barrier member 1700 is provided with brushes 1710. Bee frame 308 is pulled via member 1700 such that bees 1730 are removed from bee frame. Numeral 1720 refers to a beehive wall. A blade, a comb and a scrubber are also in the scope of the present invention.

Figure 22A:
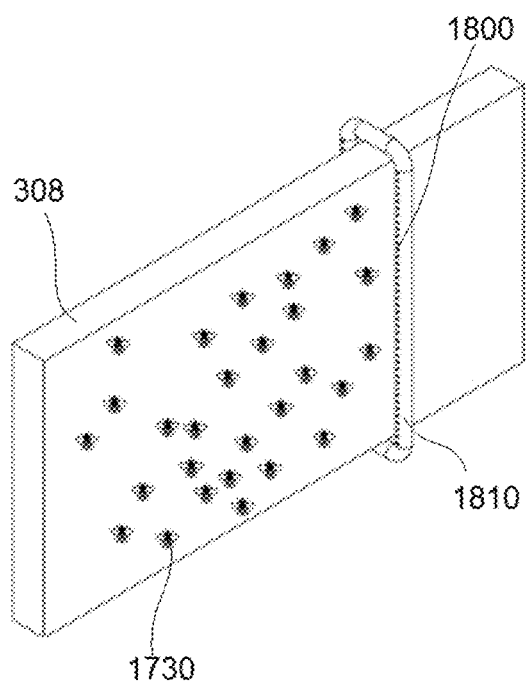
FIGS. 22a to 22c are side, isometric and enlarged views of a bee-barrier member provided with air passages.
Figure 22B:
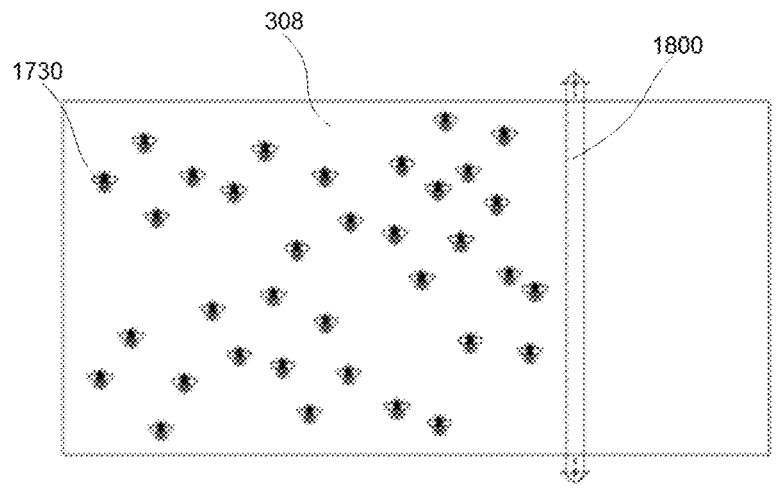
Figure 22C:
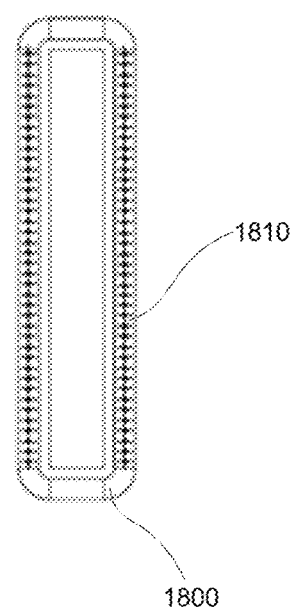

Reference is now made to FIGS. 22a to 22c presenting side, isometric and enlarged views of a bee-barrier member provided with air passages. Bee-barrier member 1800 is provided with air passages 1810 fluidly connectable to a source of compressed air configured for blowing off bees from said bee frames during removing the aforesaid frame.

In order to treat colonies which are infected with Varroa one can treat the specific cells in which the Varroa mite reproduces. Identification of infected cells can be achieved by means of detection of heat traces of such cells. Differences in temperature between infected and uninfected cells can be used to distinguish infected cell which contain the Varroa mite. Such cells can then be treated. Treatments may include mechanical punctuation of the cell, chemical treatment, heat treatment, optical treatment, radiation or any other treatment applied to the infected cells which kills, harms or sterilizes the Varroa mite, either directly or indirectly through its bee brood host. In one such embodiment, infected cells may be moved by the BeeHome robotic mechanism to a treatment area or unique treatment operates. Detection of heat emitted by the cells of the colony can be done via a digital optical device (heat-based camera) or by other heat sensors installed in either the interior or exterior of the comb and/or the hive.

Exemplary embodiments of heat-based detection of cells infected by Varroa may include but are not limited to:
1. A digital optical device which captures an image or video recording of the frame. Image or video is then analyzed to detect cells with unique temperature profile which might indicate the presence of Varroa mites.
2. Sensors which are installed in the cell of the frame and enable sensing the temperature of the cell. The data collected by these sensors is then analyzed to detect cells with unique temperature profile which might indicate the presence of Varroa mites.

Figure 23A:
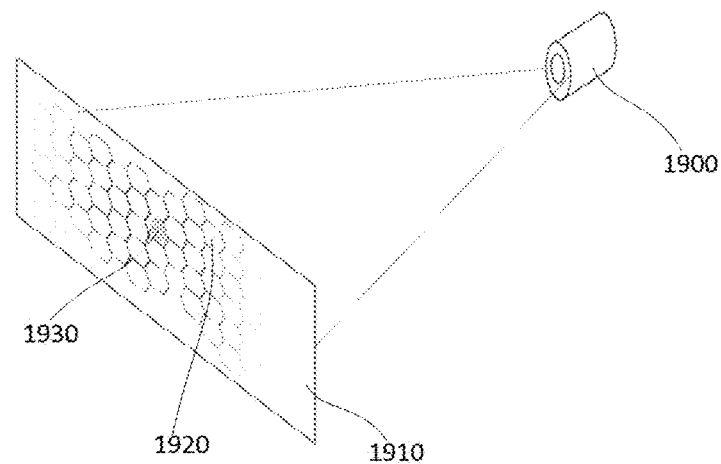
FIG. 23a is an isometric schematic view of an optical arrangement for monitoring a comb.

Reference is now made to FIG. 23a presenting a first exemplary optical embodiment of an arrangement for on-going monitoring of the overall state and health of the honeycombs and bee frames and diagnosing the cells infected by Varroa. Camera 1900 is disposed in front of comb 1910. A part of cells 1920 is infected (marked by numeral 1930).

Figure 23B:
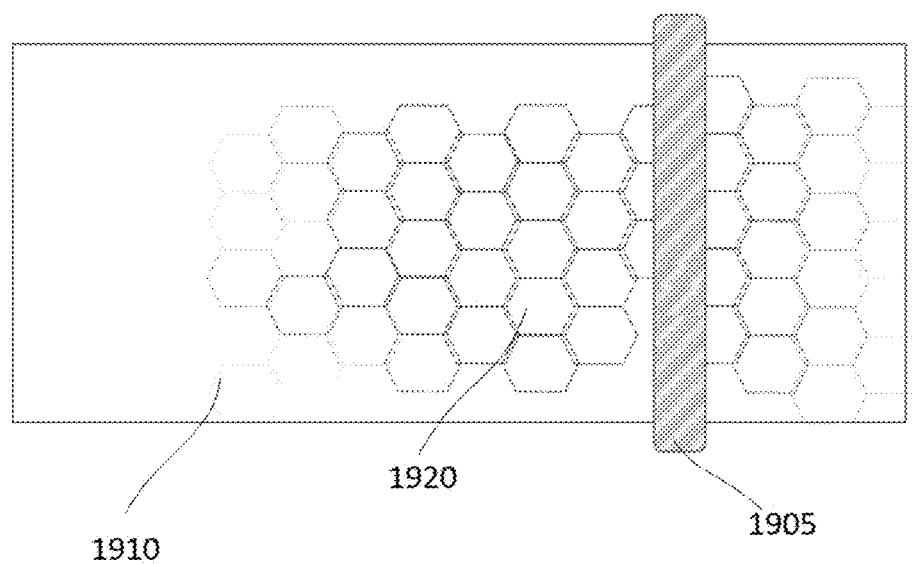
FIG. 23b is a schematic view of an optical scanner movable along embedded in a comb.

Reference is now made to FIG. 23b presenting a second exemplary optical embodiment of the diagnosing arrangement. Optical scanner 1905 is movable over comb 1910 or comb 1910 is movable over optical scanner 1905 in order to monitor the overall state and health of the honeycombs and bee frames and.

Figure 23C:
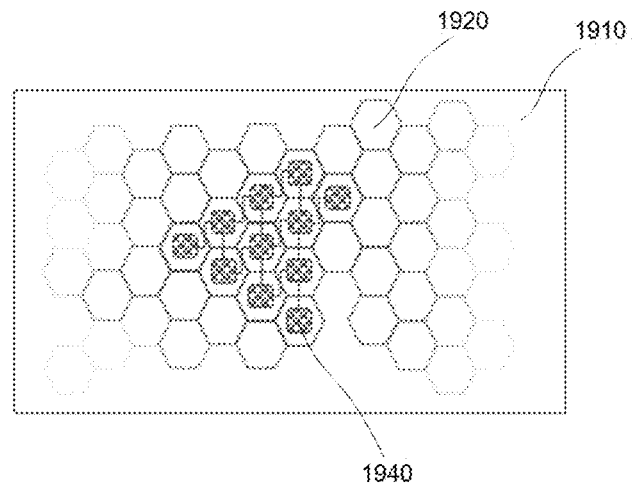
FIG. 23c is a schematic view of an arrangement of optical sensors embedded in a comb.

Reference is now made to FIG. 23c presenting a third exemplary optical embodiment of the diagnosing arrangement. An arrangement of heat sensors 1940 is embedded into comb 1910.

Figure 23D:
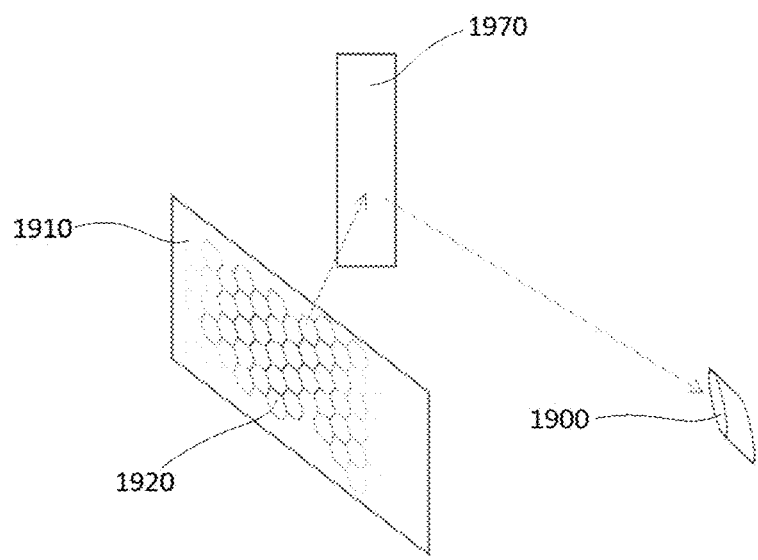
FIG. 23d is a schematic view of a mirror which directs an image of the comb to a camera.

Reference is now made to FIG. 23d presenting a fourth exemplary embodiment of the optical arrangement usable for monitoring conditions of the bees, bee cells and frames accommodated in the beehive including diagnosing bee diseases. Camera 1900 is able to capture an image of different locations on the surface of comb 1910 reflected by mirror 1970

In order to treat colonies, which are infected with Varroa, one can treat the specific cells in which the Varroa mite reproduces. Identification of infected cells can be achieved by means of detection of chemical traces in such cells. Unique Chemical traces can be used to distinguish infected cell, which contain the Varroa mite. Such cells can then be treated.

Treatments may include mechanical punctuation of the cell, chemical treatment, heat treatment, optical treatment, radiation or any other treatment applied to the infected cells which kills, harms or sterilizes the Varroa mite, either directly or indirectly through its bee brood host. In one such embodiment, infected cells may be moved by the BeeHome robotic mechanism to a treatment area or unique treatment apparatus. Detection of chemical traces in the cells or chemical traces emitted by the cells of the colony can be done via a chemical sensors installed either in the exterior or the interior of the comb and/or the hive.

Exemplary embodiments of chemical based detection of cells infected by Varroa include but are not limited to:
1. A device, which senses chemical traces outside the cells. Data produced by the device is then analyzed to detect cells with unique chemical profile, which might indicate the presence of Varroa mites.
2. Sensors, which are installed in the cell of the frame and enable sensing chemical traces in the cell. The data collected by these sensors is then analyzed to detect cells with unique chemical profile which might indicate the presence of Varroa mites.

Figure 24A:
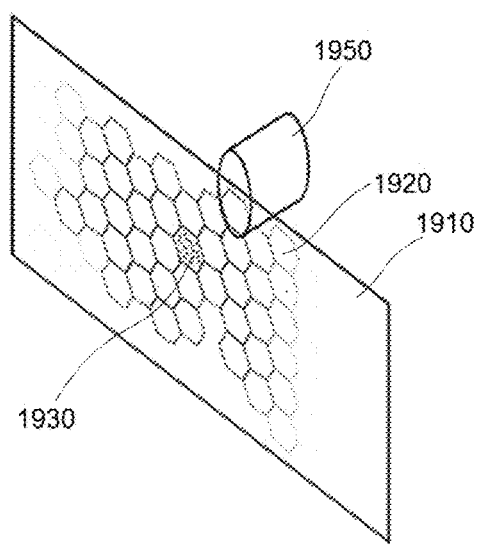
FIG. 24a is an isometric schematic view of a sensor mounted in front of a comb for diagnosing Varroa mite.

Reference is now made to FIG. 24a presenting a first exemplary embodiment of an arrangement for diagnosing the cells infected by Varroa. Chemical sensor 1950 is disposed in front of comb 1910. A part of cells 1920 is infected (marked by numeral 1930).

Figure 24B:
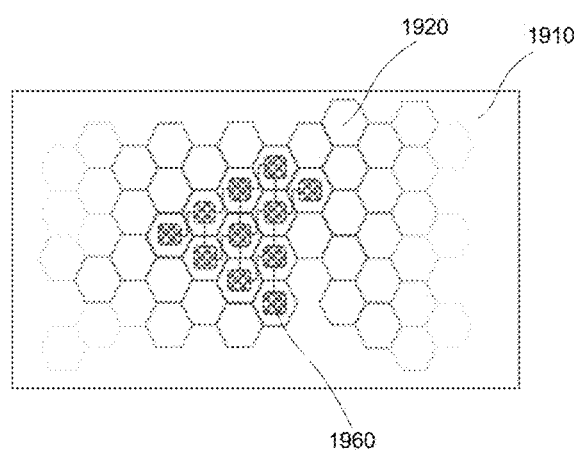
FIG. 24b is a schematic view of an arrangement of chemical sensors embedded into a comb for diagnosing Varroa mite.

Reference is now made to FIG. 24b presenting a second exemplary embodiment of the diagnosing arrangement. An arrangement of chemical sensors 1960 is embedded into comb 1910.

It should be noticed that in all the embodiments shown herein as well as other possible embodiments, a control unit, which is seen in several of the embodiments, should be electrically connected to the systems such as the disinfecting system, monitoring system, actuation system, a combination thereof and the like. The control unit will coordinate the full functioning of the beehive to allow it to work in automatic manner.

The unit of several beehives in accordance with the disclosed subject matter can be a portable unit that can be transported from one place to another for purposes such as relocation and crop pollination. Another feature is a solar panel that can provide electricity to the systems of the beehive.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. An automatic beehive with a plurality of bee frames for separating a bee frame from the plurality of bee frames during an inspection, comprising:
    at least one hive chamber having the plurality of bee frames releasably mounted within;
    a monitoring chamber comprising at least one sensor; and
    a frame loader configured for:
    placing a bee frame from said hive chamber in the frame loader,
    displace the extracted bee frame into said monitoring chamber to allow said at least one sensor to perform the inspection of the bee frame in said monitoring chamber, and
    after the inspection displace the extracted bee frame for returning said bee frame into said hive chamber and placing another bee frame from said hive chamber in the frame loader.

2. The automatic beehive according to claim 1, wherein said frame loader is displaceable in parallel to a face of the hive chamber; and
    said frame loader is linearly displaceable perpendicular to said face of said at least one hive chamber such that each of said bee frames is removable from and insertable into said at least one hive chamber.

3. The automatic beehive according to claim 1, wherein said frame loader comprises a mechanism configured for releasably gripping said bee frames therewithin.

4. The automatic beehive according to claim 1, wherein said mechanism includes a gripper.

5. The automatic beehive according to claim 1, wherein said frame loader comprises at least one loader rail oriented perpendicular to said face of said at least one hive chamber and a ball-screw linear actuator configured for removing and inserting a bee frame gripped within said frame loader.

6. The automatic beehive according to claim 1, wherein said frame loader comprises a loader gate configured for directing said bee frames during removing and inserting thereof.

7. The automatic beehive according to claim 1, further including a controller that determines whether a frame includes a honeycomb ready to be harvested according to data obtained from at least one sensor.

8. The automatic beehive according to claim 3, wherein said honey harvesting arrangement comprises a centrifuge honey extractor.

9. The automatic beehive according to claim 3, wherein:
    said arrangement for monitoring bees conditions, analyzing obtained data and reporting results to a user comprises at least one member selected from the group consisting of
    optical means selected from the group consisting of a camera, a scanner, a mirror and any combination thereof; said optical means configured for forming images of said bee frames and a light source for illumination of said bee frames; and
    a data processor configured for determining a state of the automatic beehive.

10. The automatic beehive according to claim 3, wherein said arrangement for feeding bees, comprises at least one of: a sugar tank, a water tank, a sugar solution mixer and a solution dispenser.

11. The automatic beehive according to claim 3, wherein said arrangement for climate control comprises at least one of: an air conditioning and a venting system.

12. The automatic beehive according to claim 3, wherein said arrangement for monitoring bees condition and analyzing obtained data comprises at least one sensor and an artificial intelligence unit configured for determining a state of hive chambers, and wherein the automatic beehive is configured for making beekeeping decisions and predicting failure modes of said beehive.

13. The automatic beehive according to claim 1 comprising at least one adjustable opening for enabling bees to enter and exit the automatic beehive-.

14. An automatic beehive with a plurality of bee frames for separating a bee frame from the plurality of bee frames during an inspection comprising:
   at least one hive chamber with the plurality of bee frames releasably mounted within;
   a monitoring and operating chamber comprising at least one sensor;
   at least one bee-barrier mounted between said at least one hive chamber and said monitoring and operating chamber; and
   an arrangement for separately removing each of said bee frames from the at least one hive chamber and separately delivering a bee frame to the monitoring and operating chamber, via one of the bee-barrier and for separately returning the delivered bee frame of said plurality of bee frames into said hive chamber from the monitoring and operating chamber after an inspection of the delivered bee frame by the at least one sensor in the monitoring and operating chamber;
   wherein the at least one bee-barrier is adapted to prevent bees from exiting the at least one hive chamber when one of the plurality of bee frames passes therethrough from the at least one hive chamber into the aid monitoring and operating chamber, said bee-barrier including at least one of:
   a heater configured for thermally repelling bees from said bee frame,
   a brush,
   a blade,
   a comb,
   a scrubber, and
   any combination thereof.

15. The automatic beehive according to claim 14, comprising a member selected from the group consisting of a brush, a blade, a comb, a scrubber, and any combination thereof.

16. The automatic beehive according to claim 14, comprising air passages fluidly connectable to a source of compressed air configured for blowing off bees from said bee frames during removing thereof.

17. The automatic beehive according to claim 14, wherein said bee-barrier comprises a heater configured for thermally repelling bees from said bee frames during removing thereof.

18. The automatic beehive according to claim 14 further comprising at least one arrangement selected from the group consisting of:
   an automated honey harvesting arrangement;
   an arrangement for monitoring bees conditions, analyzing obtained data and reporting results to a user; and
   an arrangement for feeding bees, pest and climate control.

19. The automatic beehive according to claim 14 wherein said arrangement for removing said bee frames from said hive chamber and inserting said bee frames thereinto comprises a frame loader displaceable in parallel to a face of a hive chamber.

20. An automatic beehive with a plurality of bee frames for separating a bee frame from the plurality of bee frames during an inspection, comprising:
   at least one hive chamber having the plurality of bee frames releasably mounted within, the plurality of bee frames are carrying a plurality of honey combs;
   a monitoring chamber comprising a thermal Varroa mite diagnostic means;
   a robotic mechanism for extracting one of the bee frames from the hive chamber, delivering the bee frame into the monitoring chamber for the inspection of one of the plurality of honeycombs by the thermal Varroa mite diagnostic means, and after the inspection return said bee frame into said hive chamber.

21. The automatic beehive according to claim 20, wherein said thermal Varroa mite diagnostic means is selected from the group consisting of: a thermal vision camera, a scanner, a visual light camera accompanied with a light source and any combination thereof configured for comb monitoring.

22. The automatic beehive according to claim 20, wherein said thermal Varroa mite diagnostic means comprises a plurality of heat sensors embedded into said comb.

23. The automatic beehive according to claim 20, wherein said mechanism for removing said bee frames from said hive chamber and inserting said bee frames thereinto comprises a frame loader displaceable in parallel to a face of a hive chamber.

24. An automatic beehive with a plurality of bee frames for separating a bee frame from the plurality of bee frames during an inspection, comprising:
   at least one hive chamber having the plurality of bee frames releasably mounted within, the plurality of bee frames are carrying a plurality of honeycombs;
   a monitoring chamber comprising a chemical Varroa mite diagnostic means;
   said bee frames releasably mounted within at least one hive chamber; and
   a mechanism for extracting one of the plurality of bee frames from said hive chamber, delivering the extracted bee frame to the monitoring chamber for the inspection of one of the plurality of honeycombs by the chemical Varroa mite diagnostic means, and after the inspection return said bee frame into said hive chamber.

25. The automatic beehive according to claim 24, wherein said chemical Varroa mite diagnostic means comprises at least one chemical sensor mounted in proximity of said bee frames; said at least one chemical sensor is configured for diagnosing Varroa mite infection.

26. The automatic beehive according to claim 24, wherein said chemical Varroa mite diagnostic means comprises a plurality of chemical sensors embedded into said comb.

27. The automatic beehive according to claim 24 wherein said mechanism for removing said bee frames from said hive chamber and inserting said bee frames thereinto comprises a frame loader displaceable in parallel to a face of hive chamber.

28. The automatic beehive according to claim 1, further comprising an arrangement for pest control, and a disinfecting system in the monitoring and operating chamber configured to operate on a bee frame immediately after detection of a parasite detected with a camera.

29. The automatic beehive according to claim 1, wherein the automatic beehive further comprises at least one member of a group consisting of: an automated honey harvesting arrangement, an arrangement for monitoring bees conditions, an arrangement for analyzing obtained data and reporting results to a user, an arrangement for feeding bees, an arrangement for pest control, an arrangement for climate control.

30. A method of beekeeping, the method comprising:
removing one of a plurality of been frames releasably mounted within at least one hive chamber of an automatic beehive,
separately delivering the removed bee frame to a monitoring and operating chamber via at a bee barrier separating between the at least one hive chamber and the monitoring and operating chamber,
using at least one sensor for performing an inspection of said bee frame separately from other bee frames of the plurality of been frames to collect data within the monitoring and operating chamber, and
separately returning the delivered bee frame into said hive chamber from the monitoring and operating chamber;
receiving at least one input from the at least one sensor; and
based on the input, automatically performing, by the automatic beehive, at least one beekeeping action.

31. The automatic beehive according to claim 1, wherein said monitoring chamber is adapted to act as a treatment chamber.

32. The automatic beehive according to claim 1, wherein said monitoring chamber is adapted to act as a disinfecting chamber.

* * * * *